United States Patent
Shirakawa

(10) Patent No.: US 7,679,562 B2
(45) Date of Patent: Mar. 16, 2010

(54) TARGET DETECTION APPARATUS AND SYSTEM

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 11/698,499

(22) Filed: Jan. 26, 2007

(65) Prior Publication Data

US 2008/0024352 A1    Jan. 31, 2008

Related U.S. Application Data

(63) Continuation-in-part of application No. 11/400,254, filed on Apr. 7, 2006, now abandoned.

(30) Foreign Application Priority Data

| Jan. 30, 2006 | (JP) | ............................ 2006-020618 |
| Sep. 14, 2006 | (JP) | ............................ 2006-249875 |

(51) Int. Cl.
| G01S 13/06 | (2006.01) |
| G01S 15/06 | (2006.01) |
| G01S 17/06 | (2006.01) |
| G01S 13/00 | (2006.01) |
| G01S 15/00 | (2006.01) |
| G01S 17/00 | (2006.01) |

(52) U.S. Cl. .......................... 342/463; 342/27; 342/52; 342/59; 342/118; 342/126; 342/146; 342/147; 342/175; 342/195; 342/450; 356/3.1; 367/87; 367/93; 367/99; 367/117

(58) Field of Classification Search .................... 342/27, 342/28, 52–55, 59, 61–67, 82–103, 175, 342/195, 196, 118, 125, 128–147, 450–465, 342/70–72, 158, 126, 127; 356/3–5.15; 367/87, 367/93, 94, 99–105, 117; 340/500, 540, 340/541, 551–567

See application file for complete search history.

(56) References Cited

U.S. PATENT DOCUMENTS 2,207,267 A * 7/1940 Plaistowe ..................... 342/27

(Continued)

FOREIGN PATENT DOCUMENTS

| EP | 1 447 680 | 8/2004 |
| JP | 9-257919 | 10/1997 |

OTHER PUBLICATIONS

Chinese First Office Action dated May 22, 2009, from the corresponding Chinese Application.

*Primary Examiner*—Bernarr E Gregory
(74) *Attorney, Agent, or Firm*—Katten Muchin Rosenman LLP

(57) ABSTRACT

A target detection apparatus that includes a transmission/reception device for generating a transmission signal for detection of a target, and extracting distance information about the target from a received signal; a number of sensors each of which transmits the transmission signal to respective different angle ranges, receives a signal reflected by the target, and transfers the received signal to the transmission/reception device; and a switch device for switching in a time division manner a connection between the transmission/reception device and one of the sensors to a connection between the transmission/reception device and another one of the sensors, where the switch device selects a first of the sensors for transmitting the transmission signal in a time slot and a second of the sensors for receiving the signal reflected by the target in the time slot.

13 Claims, 24 Drawing Sheets

U.S. PATENT DOCUMENTS

| | | | | |
|---|---|---|---|---|
| 3,184,739 A * | 5/1965 | Franklin et al. | | 342/451 |
| 3,286,263 A * | 11/1966 | Hammack | | 342/463 |
| 3,518,674 A * | 6/1970 | Moorehead et al. | | 342/457 |
| 3,531,801 A * | 9/1970 | Huebscher | | 342/125 |
| 3,691,558 A * | 9/1972 | Hoard et al. | | 342/28 |
| 3,705,404 A * | 12/1972 | Chisholm | | 342/465 |
| 3,706,096 A * | 12/1972 | Hammack | | 342/451 |
| 3,795,911 A * | 3/1974 | Hammack | | 342/463 |
| 3,821,751 A * | 6/1974 | Hammack | | 342/59 |
| 3,835,448 A * | 9/1974 | Bertheas | | 367/122 |
| 3,953,856 A * | 4/1976 | Hammack | | 342/458 |
| 3,986,182 A * | 10/1976 | Hackett | | 367/94 |
| 4,072,943 A * | 2/1978 | Miller | | 342/95 |
| 4,091,367 A * | 5/1978 | Harman | | 340/552 |
| 4,319,242 A * | 3/1982 | Lewis | | 342/67 |
| 4,357,608 A * | 11/1982 | Lewis | | 342/158 |
| 4,673,183 A * | 6/1987 | Trahan | | 342/465 |
| 5,138,321 A * | 8/1992 | Hammer | | 342/59 |
| 5,302,955 A * | 4/1994 | Schutte et al. | | 342/59 |
| 5,311,187 A * | 5/1994 | Garside | | 342/59 |
| 5,389,935 A * | 2/1995 | Drouault et al. | | 342/457 |
| 5,617,098 A * | 4/1997 | Koyanagi et al. | | 342/85 |
| 6,043,770 A * | 3/2000 | Garcia et al. | | 342/59 |
| 6,064,331 A * | 5/2000 | Avila et al. | | 342/59 |
| 6,466,155 B2 * | 10/2002 | Taylor et al. | | 342/28 |
| 6,490,456 B1 * | 12/2002 | Bogdan et al. | | 342/463 |
| 6,518,916 B1 * | 2/2003 | Ashihara et al. | | 342/90 |
| 7,196,656 B2 * | 3/2007 | Shirakawa | | 342/147 |

* cited by examiner

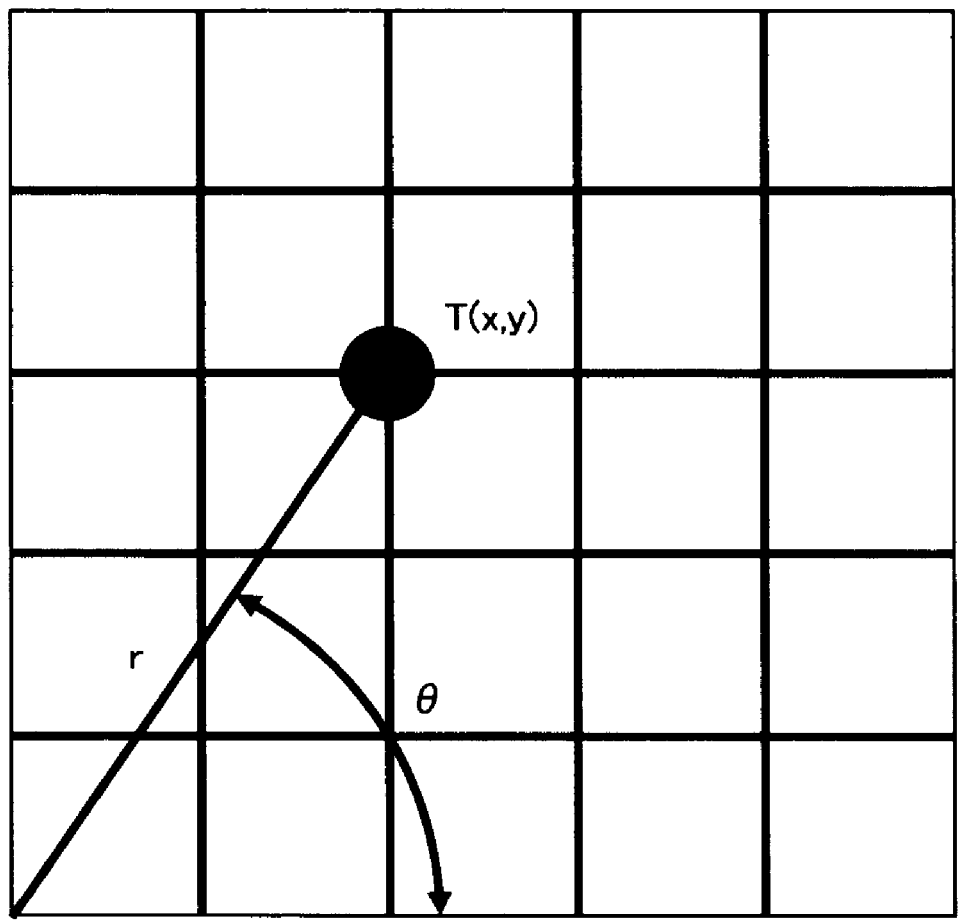
F I G. 1A

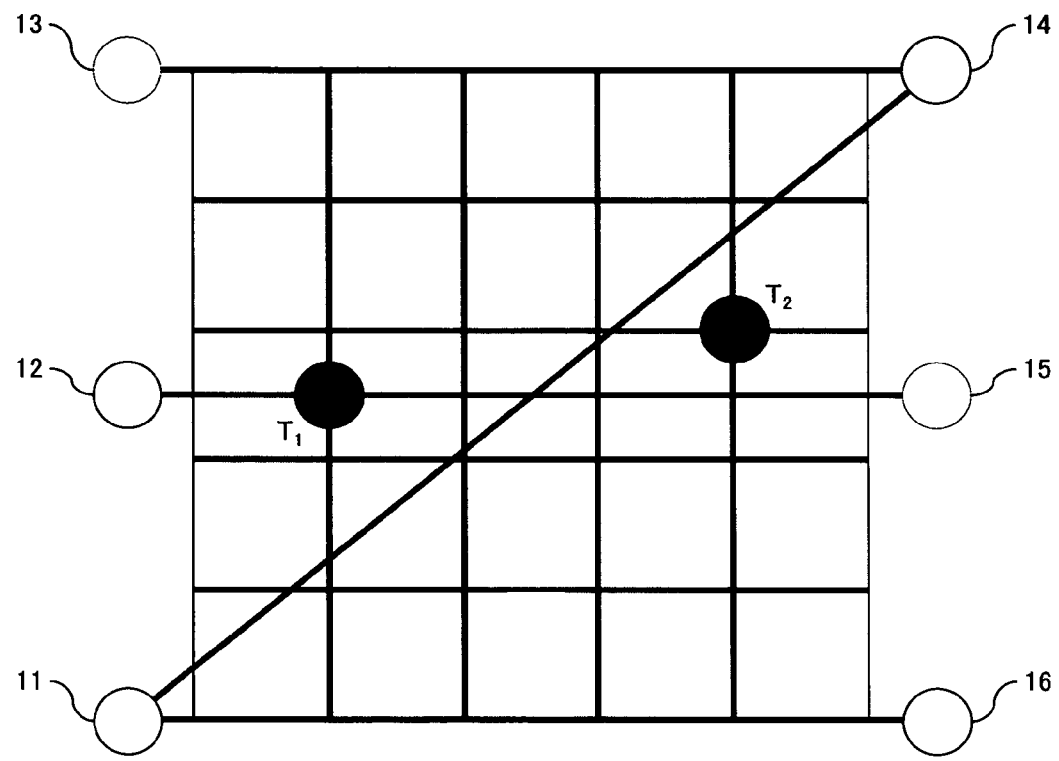
F I G. 1B

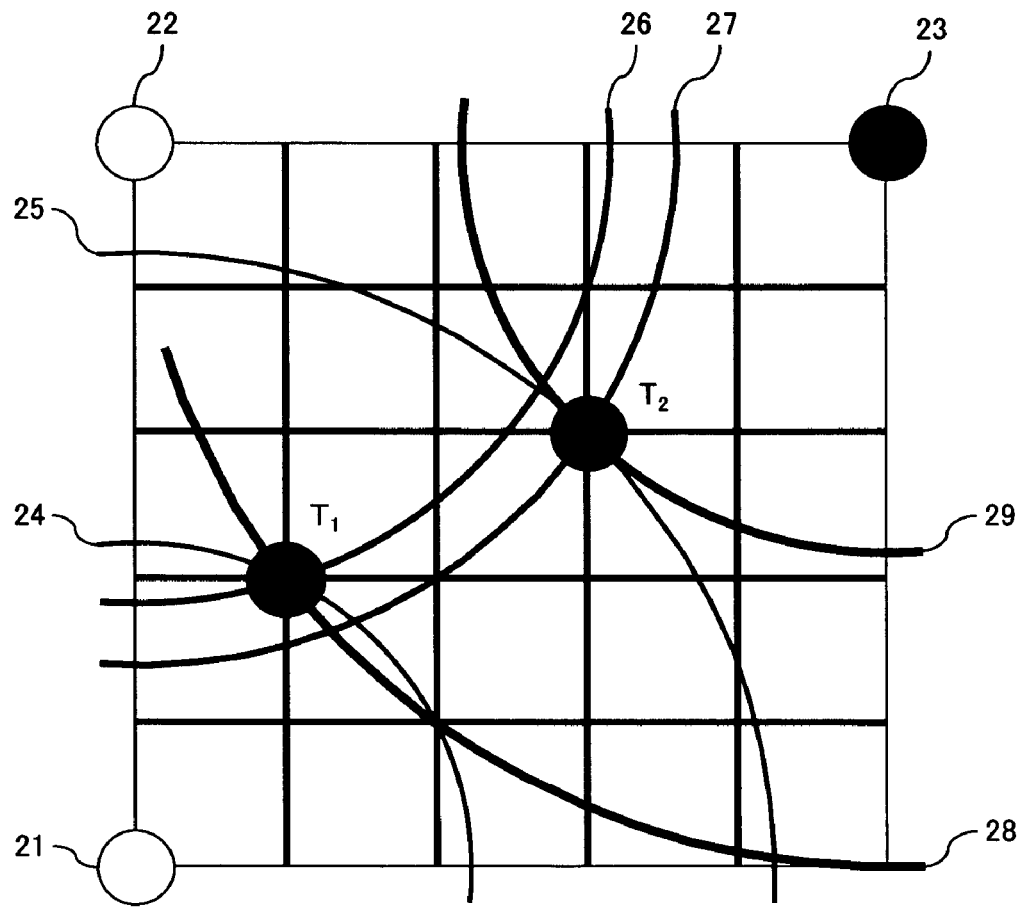
F I G. 1 C

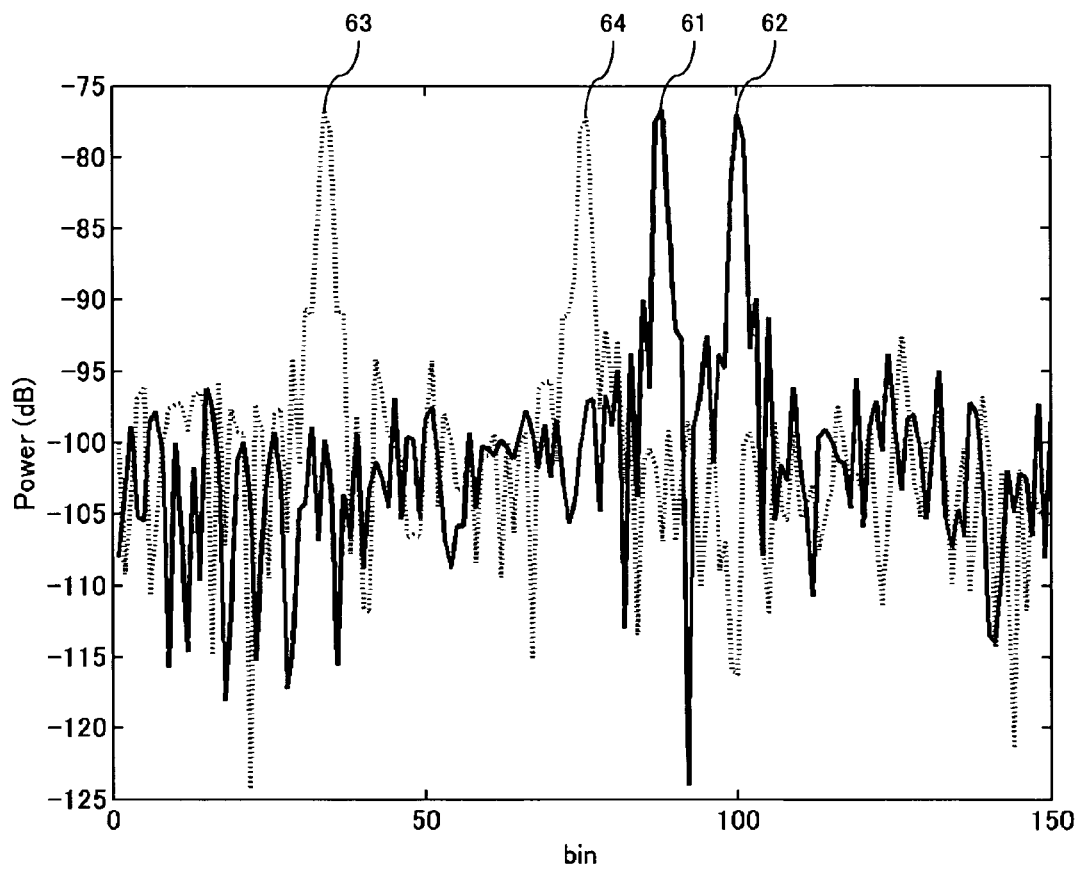
F I G. 1 E

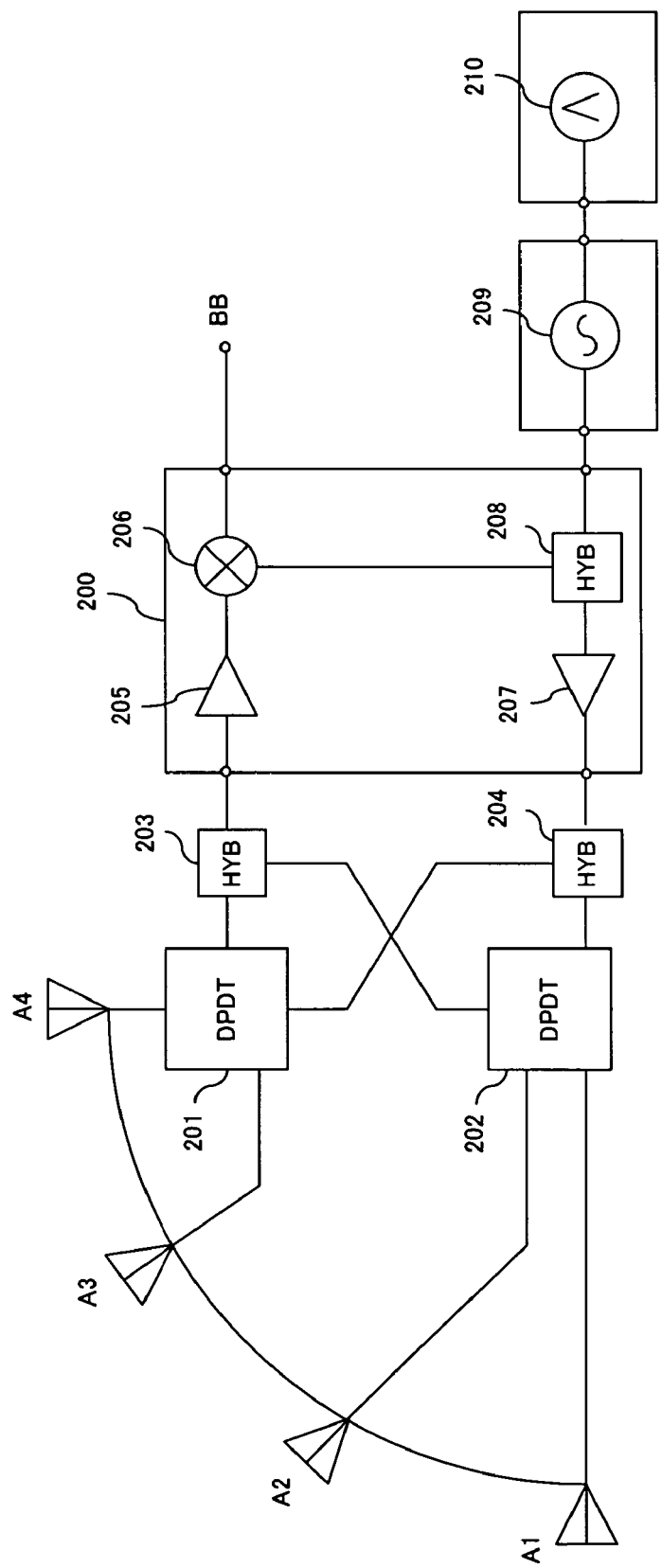
F I G. 2B

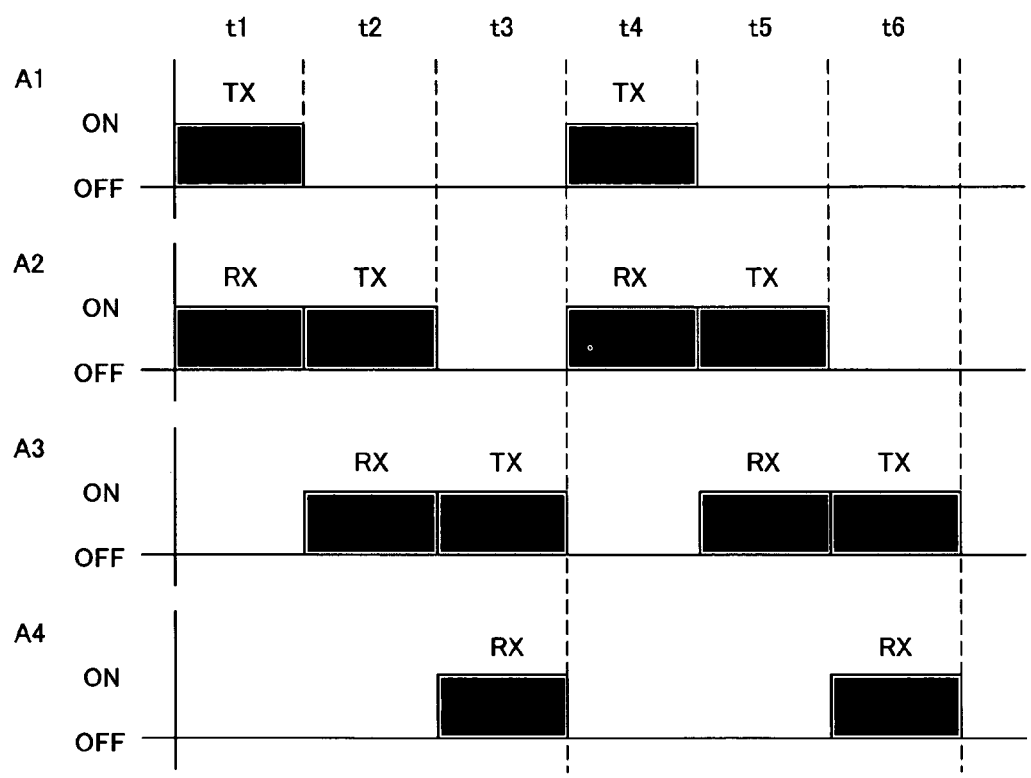
F I G. 3

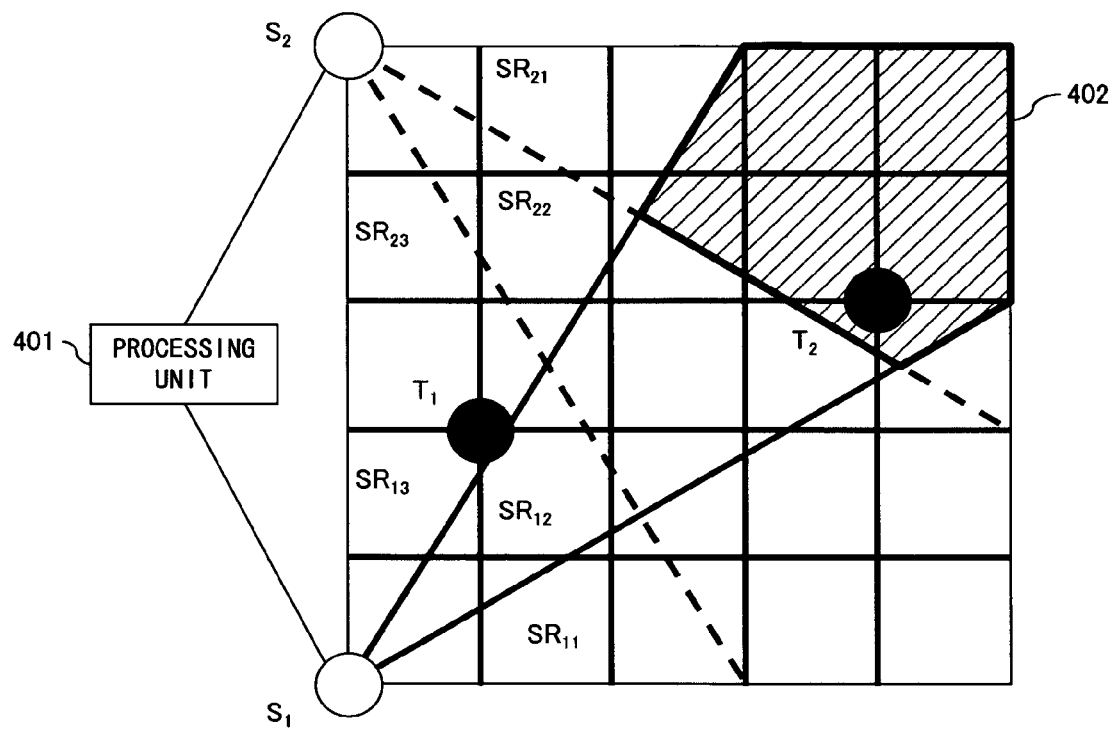
F I G. 4

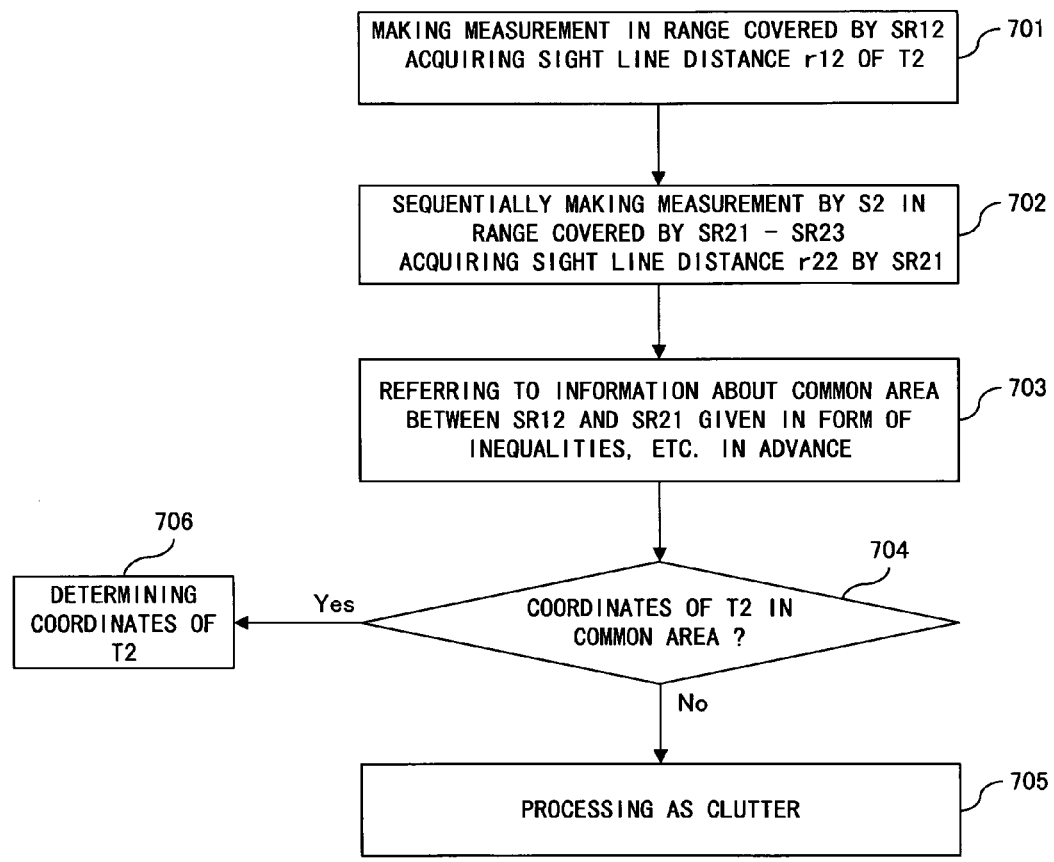
F I G. 7

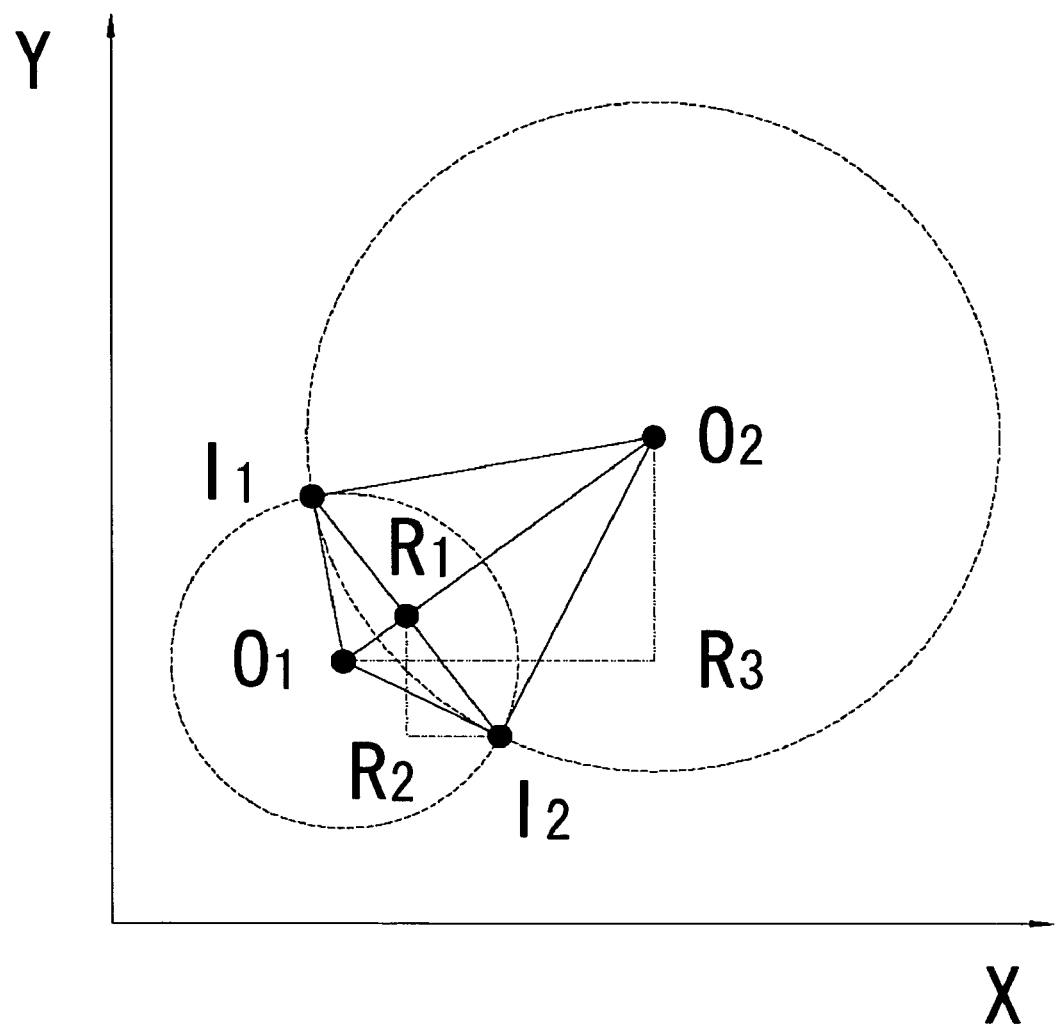
F I G. 8

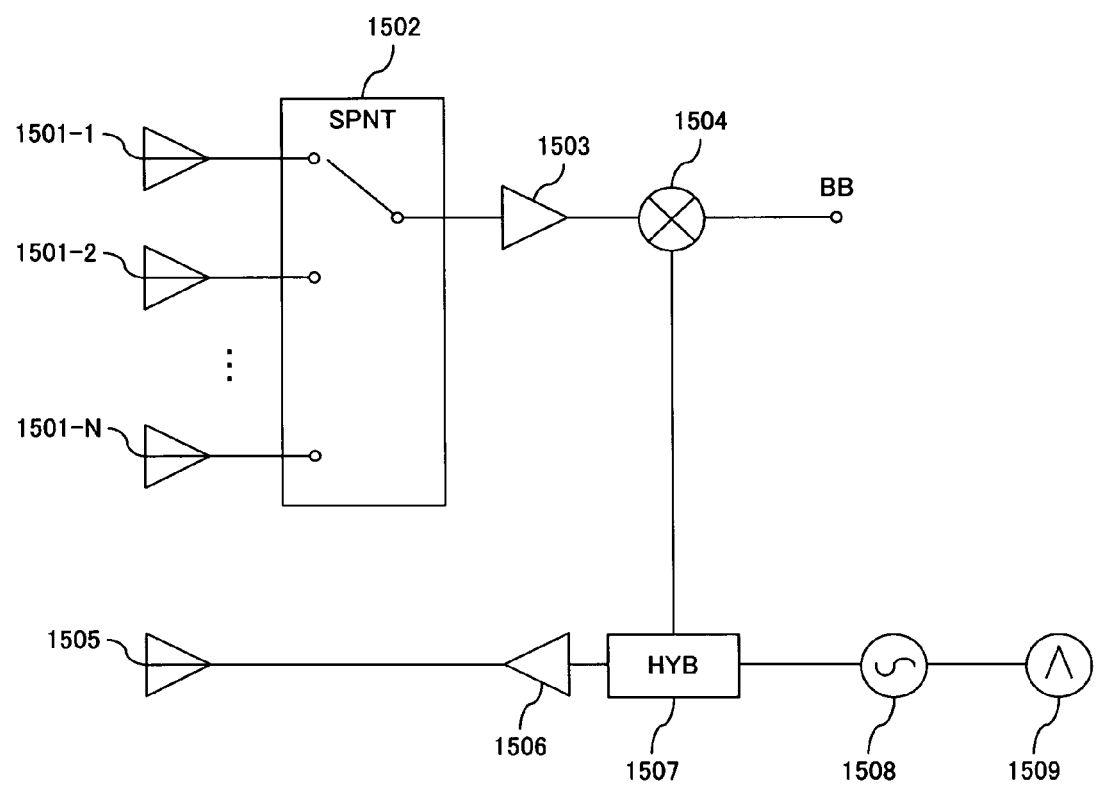
F I G. 1 5

TARGET DETECTION APPARATUS AND SYSTEM

CROSS-REFERENCE TO RELATED APPLICATIONS

This patent application is a continuation in part application of the previous U.S. patent application, titled "TARGET DETECTION APPARATUS AND SYSTEM," filed on Apr. 7, 2006, application Ser. No. 11/400,254, now abandoned, herein incorporated by reference.

BACKGROUND OF THE INVENTION

1. Field of the Invention

The present invention relates to an apparatus and a system for detecting a target such as a person, an animal, an object, etc. intruding into a monitor area.

2. Description of the Related Art

There have conventionally been a camera, a laser device, a monopulse radar device, etc. for detecting any number of targets T intruding into a predetermined monitor area as shown in FIG. 1A. The position of a target T is expressed by, for example, (x, y) in the Cartesian coordinate system (orthogonal coordinate system), and (r, θ) in the polar coordinate system.

However, since the detection device of an optical system such as a laser device, etc. has normally a very narrow beam width, a number of detection devices have to be provided as shown in FIG. 1B to detect a plurality of targets although it is capable of pinpointing a target. In the example shown in FIG. 1B, six laser devices 11 through 16 are provided around the monitor area to detect targets $T_1$ and $T_2$ by radiating laser light among the devices.

Although a detection device provided with a scanning mechanism is used, the detecting capability is considerably reduced by the dirty optical parts due to a spider's web, dust, etc. in an exposure environment especially at an intersection, a crossing, etc. Therefore, frequent maintenance is required. Furthermore, a change in the optical characteristic of a peripheral environment depending on the time can be a serious problem in guaranteeing the performance.

On the other hand, the detection device of a radio system such as a radar device, etc. is advantageous in resistance to environment, but there is the problem in performance because a target is to be localized normally as a point in the polar coordinate system. For example, a monopulse radar device has a relatively wide angle measurement range per device, but only obtains the angle of a single target. A radar device having an array antenna can calculate the angles of a plurality of targets, but is a narrow angle measurement range per device, and requires a large signal processing cost.

There is also a method of measuring only the sight line distance information about a target simply using a plurality of radar devices, solving a set of equations of circles according to the obtained information, and calculating the position of a target in the orthogonal coordinate system. When a target is uniquely localized by the triangulation only according to the distance information, it is necessary to mount a detection device having the angle measurement range of π/2 (90°) at three different points around the monitor area as shown in, for example, FIG. 1C when the monitor area is rectangular. Therefore, at least three detection devices are required.

In the example shown in FIG. 1C, detection devices 21 through 23 are mounted at the tree vertexes of the monitor area, and the positions of the targets $T_1$ and $T_2$ are identified by the triangulation. The targets $T_1$ and $T_2$ are located on the following arcs when viewed from each of the detection devices.

1. detection device 21 $T_1$: arc 24 $T_2$: arc 25
2. detection device 22 $T_1$: arc 26 $T_2$: arc 27
3. detection device 23 $T_1$: arc 28 $T_2$: arc 29

However, since the angle measurement range for a current monopulse radar device is at most π/6(30°), it is necessary to constitute each detection device by three radar devices to uniquely localize a plurality of targets with the above-mentioned configuration, thereby requiring a total of nine or more radar devices.

The following patent document 1 relates to a method of detecting an object to be monitored using the radar of a spread-spectrum system.

[Patent Document 1] Japanese Published Patent Application No. H9-257919

However, the above-mentioned conventional target detection apparatus has the following problems.

(1) A detection device of an optical system such as a laser device, etc. is subject to an influence of an ambient environment, and it is difficult to guarantee the performance when it is mounted outdoors. Additionally, it is necessary to mount a number of detection devices to detect a plurality of targets.

(2) There is a rule that one monopulse radar device detects one target. Therefore, to detect a large number of targets and localize each target according to angle information and distance information, it is necessary to mount the number of radar devices equal to the number of targets. In addition, there is a method of arranging each set of three monopulse radar devices at each of the three points around the monitor area, and calculating the position of a target by the triangulation only according to the distance information. However, since the parts constituting a radar device are expensive, it is desired to realize an angle measurement in a wide range using the smallest possible number of devices.

Therefore, to reduce the number of radar devices, for example, as shown in FIG. 1D, the detection devices 31 and 32 each including three radar devices are mounted at two points, and it is checked whether or not targets can be localized with the configuration. The true targets $T_1$ and $T_2$ are located on the following arcs when viewed from each of the detection devices.

1. detection device 31 $T_1$: arc 41 $T_2$: arc 42
2. detection device 32 $T_1$: arc 43 $T_2$: arc 44

Assuming that the distances from the detection device 31 to $T_1$ and $T_2$ are respectively $r_{11}$ and $r_{12}$, and the distances from the detection device 32 to $T_1$ and $T_2$ are respectively $r_{21}$ and $r_{22}$, the coordinates of each target is determined by the simple simultaneous equations of circles by pairing with correct measured distance such as $T_1(r_{11}, r_{21})$ and $T_2(r_{12}, r_{22})$, etc. However, the coordinates of the virtual images 51 and 52 are calculated by wrong paring.

Assume that the result as shown in FIG. 1E is obtained by measuring the sight line distance of the targets $T_1$ and $T_2$ in this system. In FIG. 1E, the horizontal axis indicates a distance index, and the vertical axis indicates the power of a baseband signal. The baseband signal in the detection device 31 show two peaks 61 and 62, and the baseband signal in the detection device 32 show two peaks 63 and 64. The distance indexes corresponding to the positions of these peaks indicate the distances to the targets $T_1$ and $T_2$.

At this time, since the peak 63 or 64 can be combined with each of the peaks 61 and 62, there can be two combinations, and the coordinates of a total of four points can be obtained in the monitor area. That is, they are the coordinates of the targets $T_1$ and $T_2$, and the virtual images 51 and 52.

The number of solutions of the simultaneous equations of circles increases in proportion to the squared number of targets. Therefore, with an increasing number of targets for the two detection devices, a higher calculating cost is required to remove detection errors, and there immediately occurs a problem if the number of devices is reduced.

(3) When a large number of targets intrude into a monitor area, it is desired to localize the position of each target as a point in the orthogonal coordinate system or the polar coordinate system to correctly discriminate the targets. However, it is very difficult to perform the process of discriminating a number of targets in a predetermined time using only an autonomous position meter in the conventional detection device in an optical system or a radar system.

SUMMARY OF THE INVENTION

The first problem of the present invention is to provide a low-cost target detection apparatus or a target detection system appropriate for an exposure environment such as an outdoor area, etc.

The second problem of the present invention is to detect a plurality of targets which have intruded into a monitor area at a high speed with high accuracy.

The target detection apparatus according to the present invention includes a transmission/reception device, a plurality of sensors, and a switch device. The transmission/reception device generates a transmission signal for detection of a target, and extracts the distance information about a target from a received signal. The plurality of sensors transmit a transmission signal to different angle ranges, receive a signal reflected by the target, and transfers the received signal to the transmission/reception device. The switch device switches a connection between the transmission/reception device and the plurality of sensors in a time division manner.

Each of the first, second, and third target detection systems according to the present invention includes a first target detection apparatus, a second target detection apparatus, and a processing device.

In the first target detection system, the first target detection apparatus has a plurality of sensors for transmitting a first transmission signal to different angle ranges, and receiving a signal reflected by a target, and extracts first distance information about the target from a received signal. The second target detection apparatus has a plurality of sensors for transmitting a second transmission signal to different angle ranges, and receiving a signal reflected by a target, and extracts second distance information about the target from a received signal.

The processing device calculates the position of the target according to the first and second distance information using the condition that the position of the target is included in a range common to both a first angle range when the first target detection apparatus extracts the first distance information and a second angle range when the second target detection apparatus extracts the second distance information.

In the second target detection system, the first target detection apparatus transmits a first transmission signal, receives a signal reflected by a target, and extracts first distance information about the target from a received signal. The second target detection apparatus transmits a second transmission signal, receives a signal reflected by the target, and extracts second distance information about the target from a received signal.

The processing device enables the first target detection apparatus and the second target detection apparatus to operate for a plurality of targets in a monostatic mode, and acquires the first distance information from the first target detection apparatus to each target, and the second distance information from the second target detection apparatus to each target. The processing device also enables the first target detection apparatus and the second target detection apparatus to operate in a bistatic mode in which the first target detection apparatus is a transmitter and the second target detection apparatus is a receiver, and acquires, for each target, total propagation distance information from the transmitter to the receiver through each target. Then, it identifies the positions of the plurality of targets by comparing the sum of the first distance information and the second distance information with the total propagation distance information about each target.

In the third target detection system, the first target detection apparatus transmits a first transmission signal, receives a signal reflected by a target, and extracts first distance information about the target from a received signal. The second target detection apparatus transmits a second transmission signal, receives a signal reflected by the target, and extracts second distance information about the target from a received signal.

The processing device enables the first target detection apparatus and the second target detection apparatus to operate for a plurality of targets, acquires the first distance information from the first target detection apparatus to each target and the second distance information from the second target detection apparatus to each target, obtains the coordinates of the intersections from the equations of the four circles having as radii the minimum value and the maximum value of the first distance information for the targets and the minimum value and the maximum value of the second distance information for the targets, and identifies the location range of the plurality of targets using the coordinates of the intersections.

BRIEF DESCRIPTION OF THE DRAWINGS

FIG. 1A shows a monitor area and a target;

FIG. 1B shows the arrangement of the laser devices;

FIG. 1C shows the triangulation by the radar devices;

FIG. 1E shows the positions of peaks of a baseband signal;

FIG. 2B shows the configuration of the target detection apparatus;

FIG. 3 is the first operation timing chart;

FIG. 4 shows a method of dividing a monitor area;

FIG. 7 is a flowchart of the first positioning method;

FIG. 8 shows a common positioning method;

FIG. 15 shows the configuration of the array radar device.

DETAILED DESCRIPTION OF THE PREFERRED EMBODIMENTS

The best modes for embodying the present invention are described below in detail by referring to the attached drawings.

Figure 1D:
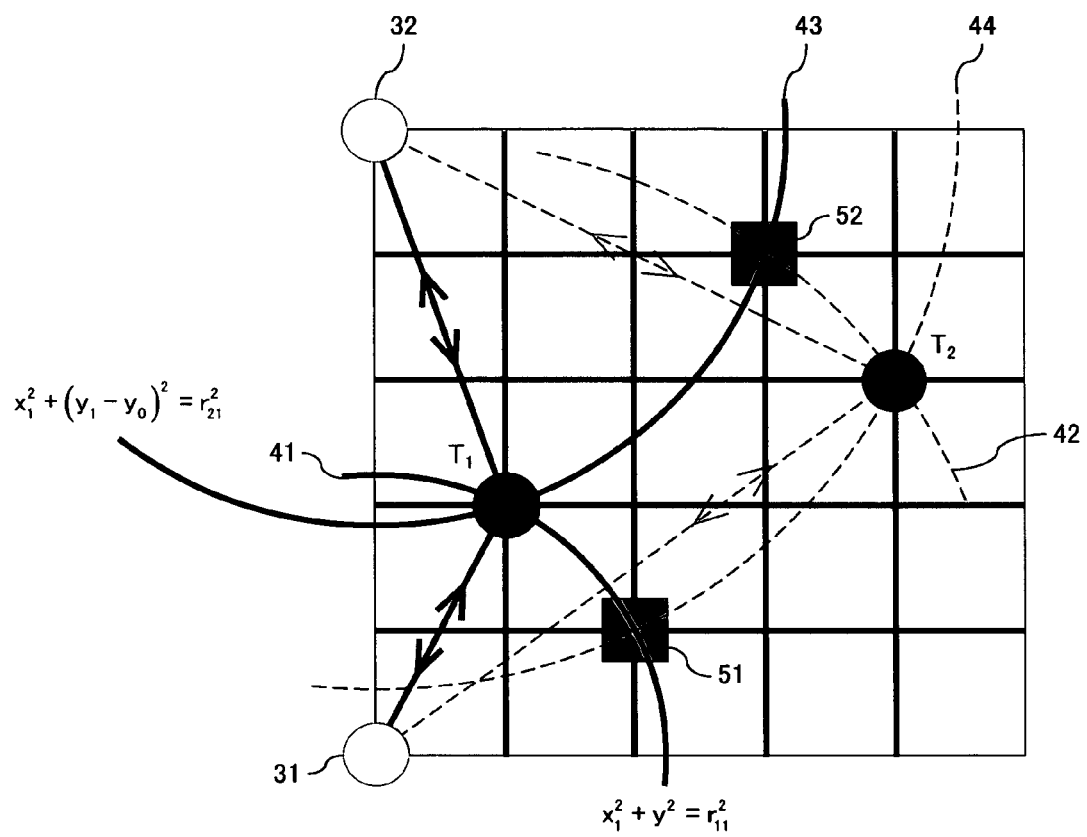
FIG. 1D shows targets and virtual images in the triangulation.
Figure 2A:
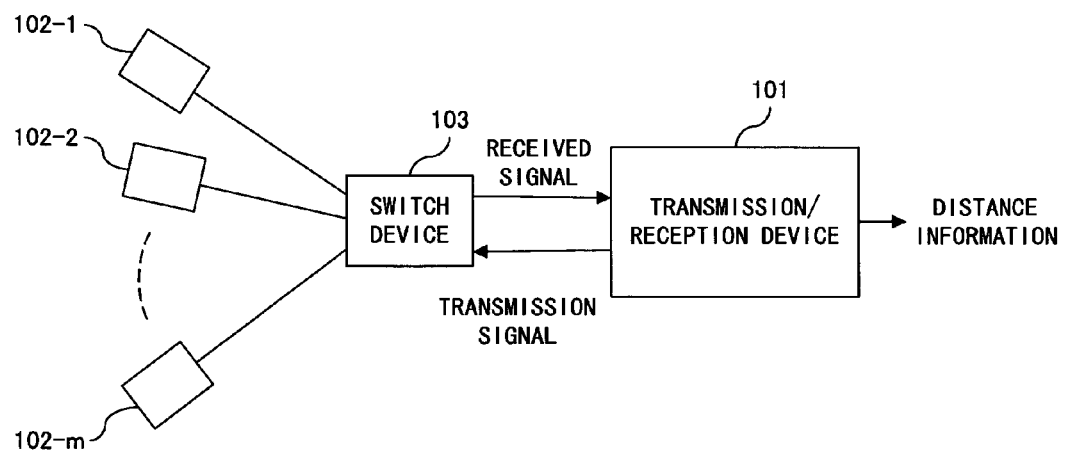
FIG. 2A shows the principle of the target detection apparatus according to the present invention.

FIG. 2A shows the principle of the target detection apparatus according to the present invention. The target detection apparatus shown in FIG. 2A comprises a transmission/reception device 101, sensors 102-1 through 102-m, and a switch device 103. The transmission/reception device 101 generates a transmission signal for detection of a target, and extracts the distance information about the target from a received signal. The sensors 102-1 through 102-m transmits a transmission signal to each of the different angle ranges, receives a signal reflected by the target, and transfers the received signal to the transmission/reception device 101. The switch device 103 switches the connection between the transmission/reception device 101 and the sensors 102-1 through 102-m in a time division manner.

The sensors 102-1 through 102-m can be, for example, an antenna for transmitting/receiving a radar signal, or an acoustic sensor for transmitting/receiving an acoustic wave. By the switch device 103 connecting in a time division manner the sensors 102-1 through 102-m to the transmission/reception device 101 for performing signal processing, a single transmission/reception device 101 can be shared among the sensors 102-1 through 102-m. Therefore, a wide monitor area can be covered with a low-cost configuration having the reduced total number of signal processing parts.

Figure 6:
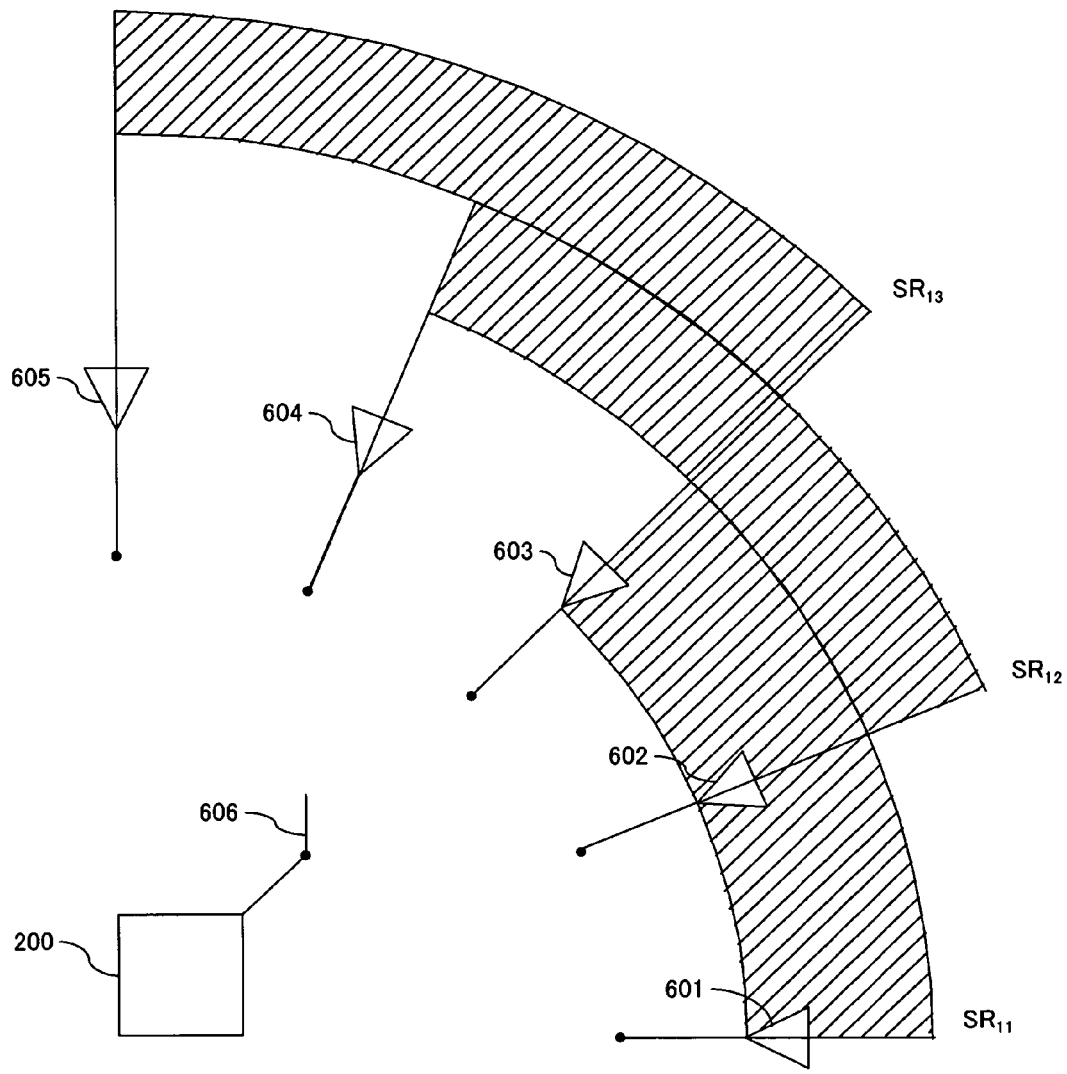
FIG. 6 shows the configuration using five antennas.

The transmission/reception device 101 corresponds to, for example, a transmission/reception unit 200, a radio frequency oscillator 209, and a baseband oscillator 210 shown in FIG. 2B, and the sensors 102-1 through 102-m corresponds to, for example, antennas A1 through A4 shown in FIG. 2B, or antennas 601 through 605 shown in FIG. 6. The switch device 103 can be, for example, double pole double throw (DPDT) switches 201 and 202 shown in FIG. 2B, or a bi-directional switch 606 shown in FIG. 6.

Furthermore, the first and second target detection systems according to the present invention are provided with the first and second target detection apparatuses and a processing device.

In the first target detection system, the first target detection apparatus has a plurality of sensors for transmitting the first transmission signal to different angle ranges and receiving a signal reflected by a target, and extracts the first distance information about the target from a received signal. The second target detection apparatus has a plurality of sensors for transmitting the second transmission signal to different angle ranges and receiving a signal reflected by a target, and extracts the second distance information about the target from a received signal.

The processing device calculates the position of the target according to the first and second distance information using the condition that the position of the target is included in a range common to both a first angle range when the first target detection apparatus extracts the first distance information and a second angle range when the second target detection apparatus extracts the second distance information.

When a target is localized using two target detection apparatuses only, the device cost can be definitely reduced as compared with the case in which three target detection apparatuses are used. By each of the first and second target detection apparatuses provided with a plurality of sensors, the angle measurement range of each device can be divided into a plurality of angle measurement ranges. Therefore, when two target detection apparatuses capture the same target, it is possible to limit the position of the target to the area common to respective angle ranges. Thus, the true target in the common area can be discriminated from the virtual image not included in the common area, thereby suppressing the possibility that the target is mistakenly detected.

In the second target detection system, the first target detection apparatus transmits a first transmission signal, receives a signal reflected by a target, and extracts the first distance information about the target from a received signal. The second target detection apparatus transmits a second transmission signal, receives a signal reflected by a target, and extracts the second distance information about the target from a received signal.

The processing device enables the first target detection apparatus and the second target detection apparatus to operate for a plurality of targets in a monostatic mode, and acquires the first distance information from the first target detection apparatus to each target, and the second distance information from the second target detection apparatus to each target. The processing device also enables the first target detection apparatus and the second target detection apparatus to operate in a bistatic mode in which the first target detection apparatus is a transmitter and the second target detection apparatus is a receiver, and acquires, for each target, total propagation distance information from the transmitter to the receiver through each target. Then, it identifies the positions of the plurality of targets by comparing the sum of the first distance information and the second distance information with the total propagation distance information about each target.

Like the first target detection system, when a target is localized using two target detection apparatuses only, the device cost can be definitely reduced as compared with the case in which three target detection apparatuses are used. In addition, by acquiring the total propagation distance information from the first target detection apparatus to the second target detection apparatus through each target by performing a measurement in the bistatic mode, additional distance information about the targets can be obtained in addition to the distance information from each device to each target.

When the first and second distance information about each of the plurality of targets can be obtained, and if the combination of the first and second distance information for a specific target is correct, then the sum has to match the total propagation distance information about the target. Therefore, by comparing the sum of the first and second distance information with the total propagation distance information, it can be discriminated whether or not the combination of the first and second distance information is correct. Then, by identifying the position of each target using a correct combination, the possibility that a target is mistakenly detected can be suppressed.

According to the present invention, a wide monitor area can be covered by a target detection apparatus or system with a low-cost configuration having a smaller number of parts.

After mounting the target detection apparatuses at only two different points around a monitor area, the possibility that a virtual image is mistakenly detected for a target can be suppressed by a simple process, and a plurality of targets can be detected at a high speed with high accuracy.

In the present embodiment, two or more target detection apparatuses are mounted at appropriate positions around a monitor area, and are enabled to operate cooperatively in order to localize a target by the triangulation. To enhance the accuracy, it is desired that three or more target detection apparatuses are used, two of them are used in the following example, and the system is described in detail for each implementation level.

First, the circuit configuration of the apparatus is described. FIG. 2B shows an example of the configuration of the target detection apparatus using radar. The target detection apparatus shown in FIG. 2B comprises antennas A1 through A4 for both transmission and reception, double pole double throw (DPDT) switches 201 and 202, branch units (HYB) 203, 204, and 208, a low-noise amplifier 205, a mixer 206, a high-power amplifier 207, the radio frequency oscillator 209, and the baseband oscillator 210. Among them, the low-noise amplifier 205, the mixer 206, the high-power amplifier 207, and the branch unit 208 are included in the transmission/reception unit 200.

The baseband oscillator 210 generates a triangular wave and outputs it to the radio frequency oscillator 209. The radio frequency oscillator 209 can be, for example, a voltage controlled oscillator, and generates a transmission signal which is frequency-modulated by the triangular wave. The branch unit 208 outputs the transmission signal to the high-power amplifier 207 and the mixer 206. The high-power amplifier 207 amplifies the transmission signal. The branch unit 204 outputs the amplified transmission signal to the switches 201 and 202.

The switch 201 has the function of outputting the transmission signal from the branch unit 204 selectively to the antenna A3 or A4, and the function of selecting the received signal from the antenna A3 or A4 and outputting it to the branch unit 203. Similarly, the switch 202 has the function of outputting the transmission signal from the branch unit 204 selectively to the antenna A1 or A2, and the function of selecting the received signal from the antenna A1 or A2 and outputting it to the branch unit 203.

Thus, a signal transmitted from any of the antennas A1 through A4 is reflected by a target in the monitor area, and received by the antenna. The branch unit 203 outputs the received signal from the switch 201 or 202 to the low-noise amplifier 205, and the low-noise amplifier 205 amplifies the received signal. Then, the mixer 206 generates a baseband (BB) signal including the distance information, the velocity information and the angle information about the target by mixing the amplified received signal and a part of the transmission signal.

In the case of a radar device, the most expensive part in the system configuration is the radio frequency circuit. Therefore, the transmission/reception unit 200, the radio frequency oscillator 209, and the baseband oscillator 210 are shared among the plurality of antennas A1 through A4. Furthermore, to reduce the total number of antennas and improve the gain of a unit antenna per aperture of a device, the antennas A1 through A4 are connected to the transmission/reception unit 200 using the bi-directional switches 201 and 202, and a necessary angle measurement range is covered in a time division manner.

Since four antennas are used in this example, the angle measurement range is divided into three sections when the adjacent two antennas (one for each of transmission and reception) are used in positioning, and the angle measurement range is divided into two sections when the adjacent three antennas (one for transmission, and two for reception, etc.) are used in positioning.

The time division operation performed when each antenna is used for transmission or reception is shown in, for example, FIG. 3. First, in the time slot t1, the antenna A1 transmits a signal, and the antenna A2 receives the signal. In the time slot t2, the antenna A2 transmits the signal, and the antenna A3 receives the signal. In the time slot t3, the antenna A3 transmits the signal, and the antenna A4 receives the signal. The similar operations are performed in the time slots t4 through t6. In this configuration example, for example, the bi-directional switch 202 appropriately switches between the transmission signal from the branch unit 204 to the antenna A1 and the received signal from the antenna A2 to the branch unit 203 in the time slot t1, in a cycle obtained by subdividing t1.

Thus, by connecting the plurality of antennas to one transmission/reception unit using a bi-directional switch in a time division manner, the entire monitor area can be covered with a low-cost configuration having a smaller number of parts.

Described below is the space division of a monitor area. As shown in FIG. 4, the range to be monitored by the system is appropriately divided depending on the angle measurement range of each antenna so that only the space information about a specific area can be valid as a restriction condition of the simultaneous equations for obtaining the coordinates of a target in a specific time period. Then, the position of the target is calculated from the combination of valid equations. Thus, there is a strong possibility that the problem of a virtual image can be solved in the case of two target detection apparatuses.

In the example shown in FIG. 4, target detection apparatuses $S_1$ and $S_2$ are mounted at the two vertexes of the monitor area, and each of the angle measurement ranges of $\pi/2$ is monitored by dividing each of them into three areas $SR_{11}$, through $SR_{13}$ or $SR_{21}$ through $SR_{23}$. Therefore, the entire monitor area is divided into nine pseudo-exclusive areas $SR_{11}$ through $SR_{13} \cap SR_{21}$ through $SR_{23}$.

The processing unit 401 is connected to the target detection apparatuses $S_1$ and $S_2$, and includes a fast Fourier transform unit, a CPU (central processing unit), a memory, etc. The memory stores in advance the information about a monitor area dividing method and the information about the position and the shape of each exclusive area. In the information, the information about each exclusive area can be inequalities indicating the coordinates in the area, etc.

The processing unit 401 controls the operations of the target detection apparatuses $S_1$ and $S_2$, performs the fast Fourier transform on the baseband signal output from each target detection apparatus, and extracts the distance information and the velocity information about a target. Then, according to the extracted distance information, the position of the target is calculated.

The target detection apparatuses $S_1$ and $S_2$ can be, for example, the device shown in FIG. 2B, and the two adjacent antennas measure each angle range. At this time, the processing unit 401 controls the time dividing operation of the antennas A1 through A4 by switching the switches 201 and 202 for a predetermined time slot.

Figure 5:
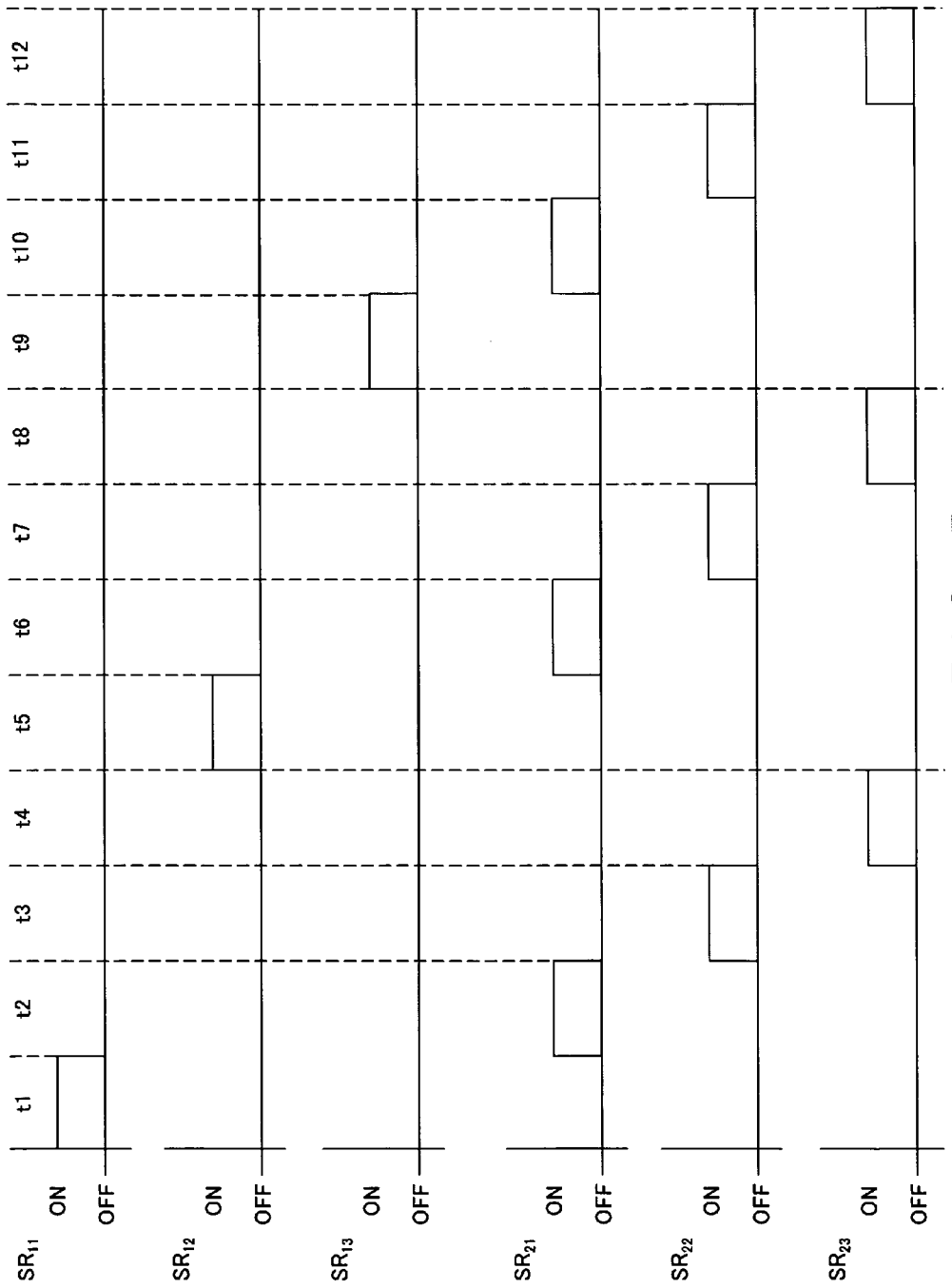
FIG. 5 is the second operation timing chart.

The time dividing operation in this example is shown in, for example, FIG. 5. First, in the time slot t1, the target detection apparatus $S_1$ measures the $SR_{11}$. Then, in the time slots t2 through t4, the target detection apparatus $S_2$ sequentially measures the $SR_{21}$ through $SR_{23}$. Next, in the time slot t5, the target detection apparatus $S_1$ measures the $SR_{12}$. Then, in the time slots t6 through t8, the target detection apparatus $S_2$ sequentially measures the $SR_{21}$ through $SR_{23}$.

In the time slot t9, the target detection apparatus $S_1$ measures the angle range $SR1_3$. In the next time slots t10 through t12, the target detection apparatus $S_2$ sequentially measures the $SR_{21}$ through $SR_{23}$. Thus, the time division operations are repeated.

When the space division as shown in FIG. 4 is performed, the number of antennas is not limited to four. For example, when five antennas 601 through 605 are used as shown in FIG. 6, the antennas 601 through 603 cover the angle range $SR_{11}$, the antennas 602 through 604 cover the angle range $SR_{12}$, and the antennas 603 through 605 cover the angle range $SR_{13}$. These antennas are connected to the transmission/reception unit 200 by the bi-directional switch 606. The bi-directional switch 606 can be, for example, a combination of a double pole double throw switch and a double pole 3-throw (DP3T) switch.

Described below is the positioning algorithm of a target based on the space division as shown in FIG. 4. In FIG. 4, it is assumed that the position of the target detection apparatus $S_1$ is the origin (0, 0) of the xy coordinate system, the axes of abscissas and ordinate are respectively defined as an x axis and a y axis, and the coordinates of the target detection apparatus $S_2$ are $(0, y_0)$.

It is also assumed that, after operating the target detection apparatuses $S_1$ and $S_2$ according to the timing chart shown in FIG. 5, the sight line distances to the targets $T_1$ and $T_2$ measured by the target detection apparatus $S_1$ are respectively $r_{11}$ and $r_{12}$, and the sight line distances to the targets $T_1$ and $T_2$ managed by the target detection apparatus $S_2$ are respectively $r_{21}$ and $r_{22}$.

When the coordinates of the targets $T_1$ and $T_2$ are $(x_1, y_1)$ and $(x_2, y_2)$, the following four equations are obtained as simultaneous equations of circles.

$$x_1^2 + y_1^2 = r_{11}^2 \quad (1)$$

$$x_2^2 + y_2^2 = r_{12}^2 \quad (2)$$

$$x_1^2 + (y_1 - y_0)^2 = r_{21}^2 \quad (3)$$

$$x_2^2 + (y_2 - y_0)^2 = r_{22}^2 \quad (4)$$

Assuming that a data measurement is performed in the time period (time slots t5 and t6) in which the common area 402 of $SR_{12}$ and $SR_{21}$ ($SR_{12} \cap SR_{21}$) is active, a valid combination of equations is a combination of equations (2) and (4) by referring to the range of distances, and the coordinates of $T_2$ are uniquely determined by the following equations.

$$y_2 = -(r_{22}^2 - r_{12}^2 - y_0^2)/2y_0 \quad (5)$$

$$x_2 = \sqrt{r_{12}^2 - y_2^2} \quad (6)$$

FIG. 7 shows an example of a flowchart of the positioning method for the target $T_2$ in this case. First, the processing unit 401 enables the target detection apparatus $S_1$ to measure the range of the $SR_{12}$, and acquires the sight line distance $r_{12}$ of the target $T_2$ (step 701). Next, it enables the target detection apparatus $S_2$ to sequentially measure the ranges of the $SR_{21}$ through $SR_{23}$, and acquires the sight line distance $r_{22}$ of the target $T_2$ in the range of the $SR_{21}$ (step 702).

Next, by referring to the information about the common area 402 stored in advance in the memory, the simultaneous equations of circles are solved and the coordinates of $T_2$ are obtained (step 703). At this time, since the coordinates of two points are obtained as the intersections of two circles, it is verified whether or not each point is included in the common area 402 (step 704).

Then, the point included in the common area 402 is determined as the position of the $T_2$, and the $r_{12}$ and $r_{22}$ are excluded from the application targets of the simultaneous equations of circles (step 706). On the other hand, the point not included in the common area 402 is discarded as a clutter (step 705).

Thus, if the simultaneous equations of circles are solved by assigning the space information about an exclusive area to be measured in each time slot, although influence from another target is received, the probability of the detection of a virtual image due to an unclear combination of equations can be lowered, and the probability that the coordinates of a target can be uniquely obtained can be enhanced.

The space division of a monitor area can be performed based on not only time, but also a frequency or a code. For example, when a code division method is used, a specific code is added to each exclusive area, and each of the angle ranges $SR_{11}$ through $SR_{13}$ and $SR_{21}$ through $SR_{23}$ is assigned the codes of a plurality of exclusive areas included in the range. By the codes assigned to both of the angle ranges measured by the $S_1$ and $S_2$, the exclusive area in which the target is located is identified.

In the example above, the coordinates of the target detection apparatuses $S_1$ and $S_2$ are set to special values for simple explanation. However, the intersections $I_1(x_1, y_1)$ and $I_2(x_2, y_2)$ of the circles can be calculated only according to the information about the sight line distances to the target even if they are set at any positions $O_1(x_{01}, y_{01})$ and $O_2(x_{02}, y_{02})$ as shown in FIG. 8.

In FIG. 8, the coordinates of the intersection $R_1$ of the straight line passing $O_1$ and $O_2$ and the straight line passing $I_1$ and $I_2$ are $(x_R, y_R)$, and the distances between the points are: d between $O_1$ and $O_2$; $r_1$ between $O_1$ and $I_1$; s between $O_1$ and $R_1$; $r_2$ between $O_2$ and $I_1$; t between $I_1$ and $R_1$ (=$I_2$ and $R_1$); dx between $R_2$ and $I_2$; and dy between $R_2$ and $R_1$. At this time, the coordinates of the two points $I_1$ and $I_2$ corresponding to the true target or the virtual image are obtained by the following equations. The $R_2$ is the intersection of the straight line drawn from $R_1$ parallel to the y axis and the straight line drawn from $I_2$ parallel to the x axis, and $R_3$ is an intersection of the straight line drawn from $O_2$ parallel to the y axis and the straight line drawn from $O_1$ parallel to the x axis.

$$s = -\frac{1}{2d}(r_2^2 - r_1^2 - d^2), \quad t = \sqrt{r_1^2 - s^2} \quad (7)$$

$$x_R = x_{01} + (x_{02} - x_{01})s/d, \quad y_R = y_{01} + (y_{02} - y_{01})s/d$$

$$\Delta R_1 R_2 I_2 \propto \Delta O_1 O_2 R_3 \rightarrow \begin{cases} dx = (y_{02} - y_{01})t/d \\ dy = (x_{02} - x_{01})t/d \end{cases}$$

$$\therefore I_1(x_R - dx, y_R + dy), I_2(x_R + dx, y_R - dy)$$

The space division method for a monitor area is not limited to dividing into nine sections as shown in FIG. 4, and an appropriate division method is used depending on the configuration of the target detection apparatuses $S_1$ and $S_2$.

Figure 9:
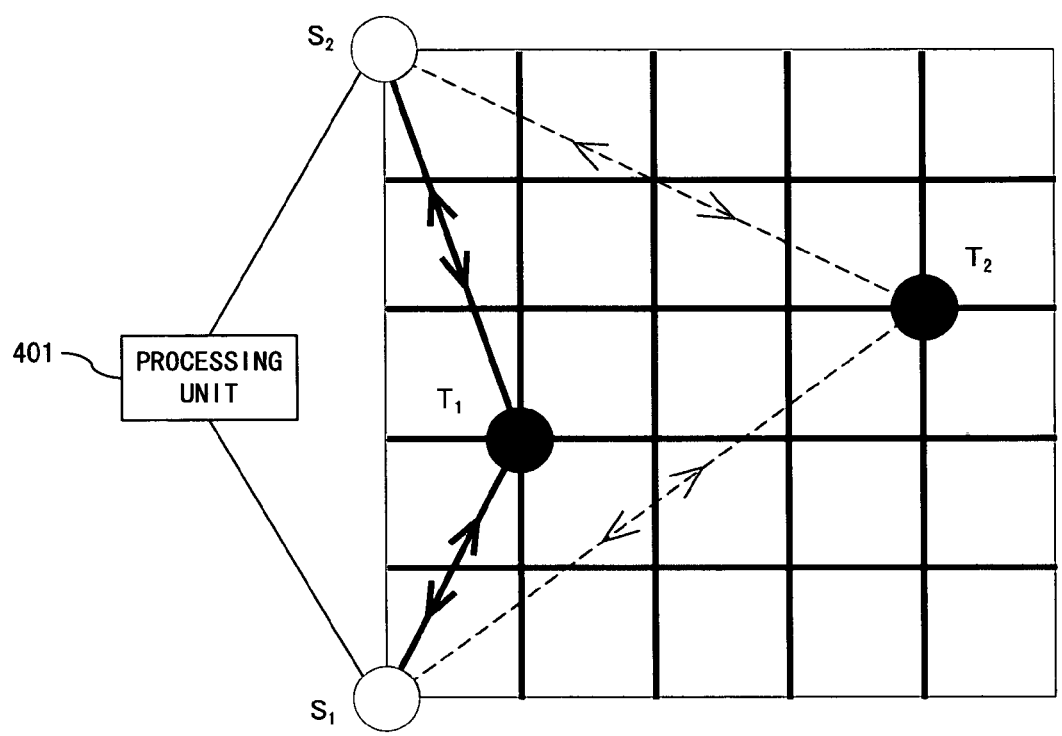
FIG. 9 shows the operation in a monostatic mode.

Next, a synchronous positioning method is explained below. In this positioning method, as shown in FIG. 9, the target detection apparatuses $S_1$ and $S_2$ are first operated as normal monostatic radars in the monostatic mode, and the sight line distances $r_{11}/r_{12}$ and $r_{21}/r_{22}$ to the targets $T_1/T_2$ are measured.

Figure 10:
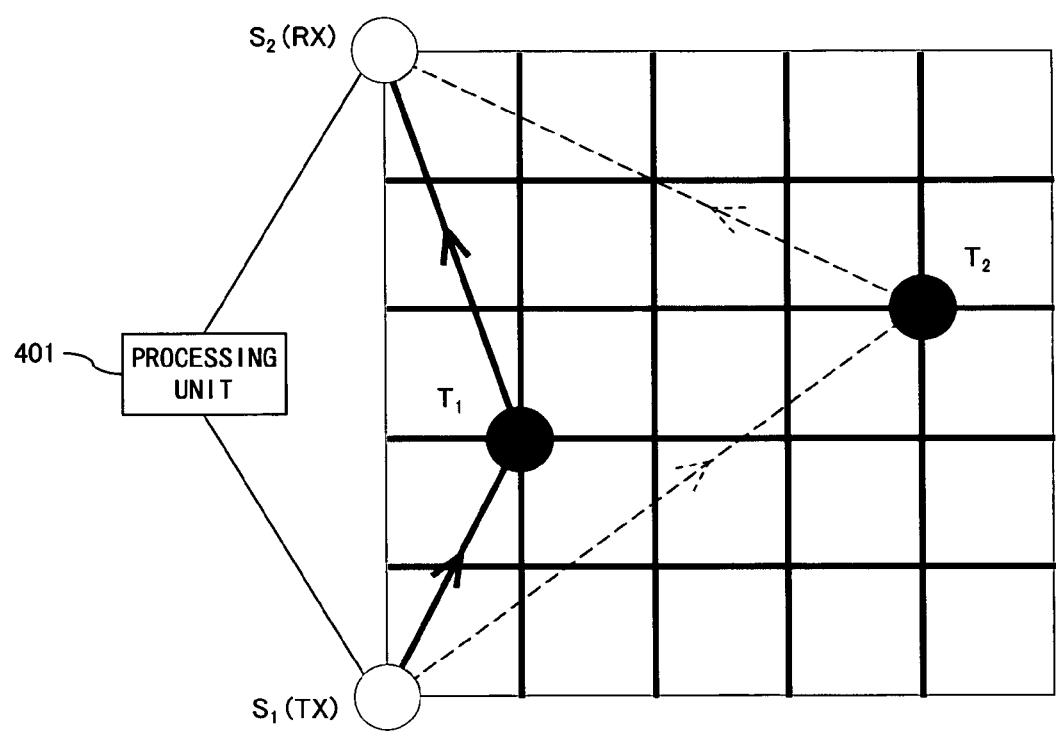
FIG. 10 shows the operation in a bistatic mode.

Then, as shown in FIG. 10, the target detection apparatuses $S_1$ and $S_2$ separate from each other constitute a transmission/reception system in the bistatic mode, and the system operates as a bistatic radar. For example, the $S_2$ measures the component obtained as a result of reflecting the transmission signal from the $S_1$ by the $T_1$ and $T_2$ in the bistatic mode, and the $r_{112}(=r_{11}+r_{21})$ and $r_{122}(=r_{12}+r_{22})$ as the total propagation distances of the respective routes of the $S_1 \rightarrow T_1 \rightarrow S_2$ and $S_1 \rightarrow T_2 \rightarrow S_2$ are measured. It is obvious that the measurement can be performed in the inverse propagation order with the functions of the $S_1$ and $S_2$ are exchanged.

Finally, the four total propagation distances are calculated using the coordinates (coordinates of four points including two virtual images) of $T_1$ and $T_2$ in the monitor area calculated from the above-mentioned set of equations of circles. When they are compared with the measured values of the $r_{112}(=r_{11}+r_{21})$ and $r_{122}(=r_{12}+r_{22})$, the correct coordinates of the $T_1$ and $T_2$ can be obtained. For example, the correct coordinates of the $T_1$ are easily known as the values calculated from a set of the equations (1) and (3).

At this time, the optimizing process in which the absolute value of the difference in distance is used as an objective function as in the following equation, can be performed to obtain the coordinates of each target. The initial value of the coordinates of each target can be calculated by appropriately combining the equations (1) through (4). In the equation (8), p denotes appropriate real number.

$$J=\Sigma|(r_{ii}+r_{ji})-[\sqrt{x_i^2+y_i^2}+\sqrt{x_i^2+(y_i-y_0)^2}]|^{1/p} \qquad (8)$$

Thus, by combining the information obtained in the monostatic mode and the bistatic mode, the correct coordinates of a target can be determined.

Figure 11:
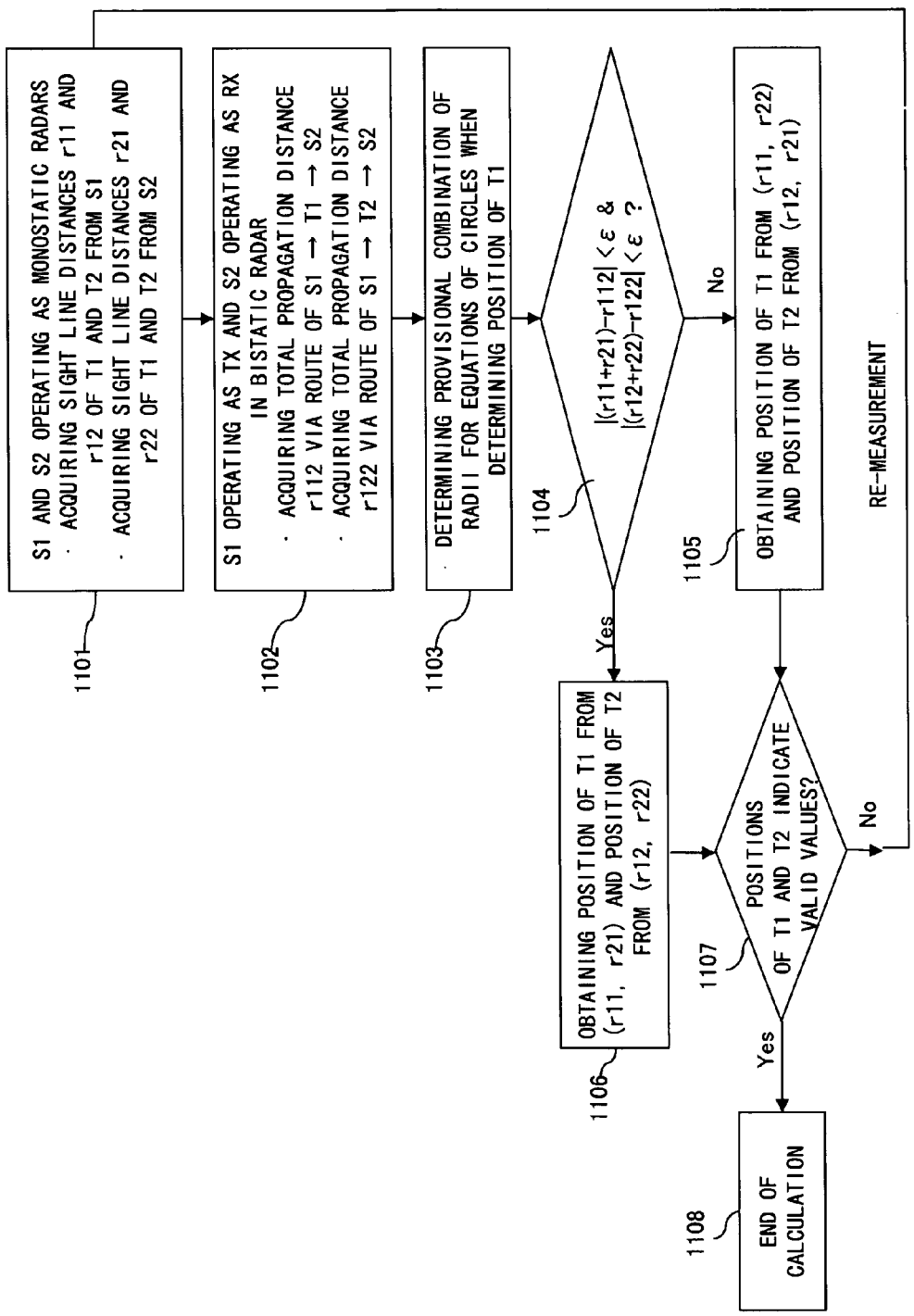
FIG. 11 is a flowchart of the second positioning method.

FIG. 11 is a flowchart of the positioning method for the targets $T_1$ and $T_2$ using the synchronous poisoning. First, the processing unit 401 enables the target detection apparatuses $S_1$ and $S_2$ to operate as normal monostatic radars, and acquires the sight line distances $r_{11}$, $r_{12}$, $r_{21}$, and $r_{22}$ (step 1101). However, at this stage, it is not determined which is the correct distance to the $T_1$, $r_{11}$ or $r_{12}$. Similarly, it is also assumed that it is not determined which is the correct distance to the $T_2$, $r_{21}$ or $r_{22}$.

Next, the $S_1$ and the $S_2$ operate as a bistatic radar with the $S_1$ and the $S_2$ as a transmitter and a receiver, respectively, and the total propagation distances $r_{112}$ and $r_{122}$ of $S_1 \rightarrow T_1 \rightarrow S_2$ and $S_1 \rightarrow T_2 \rightarrow S_2$ are acquired (step 1102).

Then, to calculate the position of the target $T_1$ by the simultaneous equations of circles, a provisional combination or radii is determined (step 1103). In this embodiment, for example, $r_{11}$ and $r_{21}$ are used as the provisional combination.

Next, using a small threshold value ε, it is checked whether or not the two following inequalities are satisfied (step 1104).

$$|(r_{11}+r_{21})-r_{112}|<\epsilon \ \& \ |(r_{12}+r_{22})-r_{122}|<\epsilon \qquad (9)$$

If these inequalities are satisfied, the coordinates of the target $T_1$ are calculated from the combination of $r_{11}$ and $r_{21}$, and the coordinates of the target $T_2$ are calculated from the combination of $r_{12}$ and $r_{22}$ (step 1106). If one of the inequalities is not satisfied, the coordinates of the target $T_1$ are calculated from the combination of $r_{11}$ and $r_{22}$, and the coordinates of the target $T_2$ are calculated from the combination of $r_{12}$ and $r_{21}$ (step 1105).

Then, it is checked whether or not the calculated coordinates of the targets $T_1$ and $T_2$ are valid values (step 1107). In this embodiment, for example, when the monitor area is a square having each side of y0, it is determined that the coordinates are valid if both x and y coordinates are positive real numbers in the section [0, y0]. Otherwise, it is determined that they are invalid. If the coordinates of the targets $T_1$ and $T_2$ are valid values, the positioning terminates (step 1108). Otherwise, the operations in and after step 1101 are repeated, and the measurement is performed again. In the application in which security is accented, if a reasonable value cannot be obtained by repeatedly performing a measurement the predetermined appropriate number of times, then, for example, only using a result of a monostatic measurement, the coordinates of all points appearing in the monitor area are processed as existing target points (in an appropriate in which security is not specifically accented, the values can be processed as clutter).

Described below is a mixed positioning method using an optical system sensor such as a laser and camera, etc. and a lidar/radar device. As described above, from the point of view of pinpointing an intruder, there is a case where a laser excels radar. Then, normally, radar is used in monitoring a wide range in a wide-angle monitor mode, and a laser is used in correctly detecting an intruder when the intruder is anticipated into an emergency area in terms of time for example, thereby preparing a hybrid system.

In this system, a single laser light source is directly or indirectly modulated using an appropriate signal source, the modulated optical signal is distributed as is to each device, and a synchronous source oscillation required for a radar signal is recovered using a photo-detector, etc. in each device.

Figure 12:
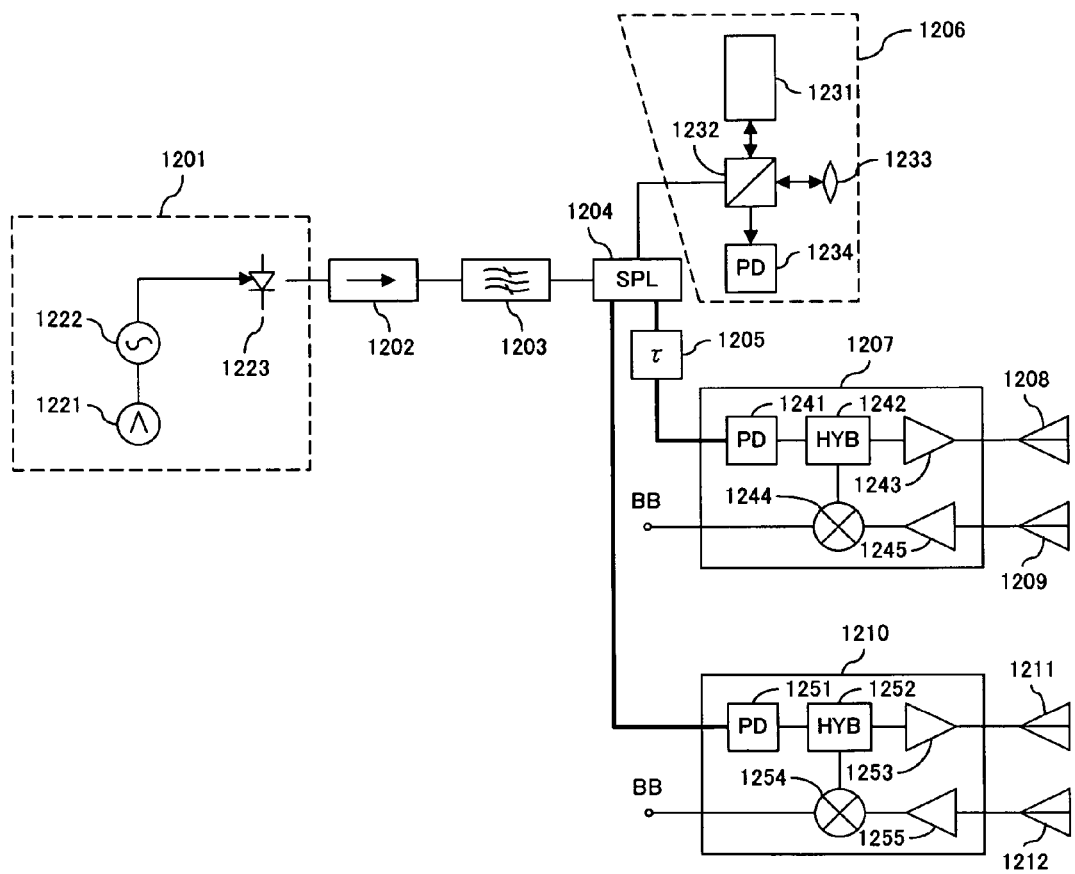
FIG. 12 shows the configuration of a hybrid system.

FIG. 12 shows an example of the configuration of the hybrid system. This system comprises a laser light source 1201, an optical isolator 1202, an optical band pass filter 1203, a splitter 1204, a delay device 1205, a laser detection unit 1206, radar transmission/reception unit 1207 and 1210, transmission antennas 1208 and 1211, and reception antennas 1209 and 1212. The splitter 1204 and the delay device 1205, the delay device 1205 and the 1207, and the splitter 1204 and the radar transmission/reception unit 1210 are connected to each other via a phase stabilized optical fiber.

The laser light source 1201 includes a baseband oscillator 1221, a radio frequency oscillator 1222, and a distributed feedback laser 1223. The output light of the distributed feedback laser 1223 is directly modulated by the transmission signal generated by the baseband oscillator 1221 and the radio frequency oscillator 1222, and is output as an optical signal. The optical signal is branched into three sections by the splitter 1204 through the optical isolator 1202 and the optical band pass filter 1203.

The first optical signal is transferred to the laser detection unit 1206, and the second optical signal is transferred to the radar transmission/reception unit 1207, and the third optical signal is transferred to the radar transmission/reception unit 1210. The amount of delay T of the delay device 1205 is set such that the optical signal can reach the radar transmission/reception unit 1207 and the radar transmission/reception unit 1210 at the same time.

The laser detection unit 1206 includes a reference mirror 1231, a half mirror 1232, a lens 1233, and a photo-detector (PD) 1234, and radiates the light transferred from the laser light source 1201 to the monitor area through the half mirror 1232 and the lens 1233. Then, it detects the reflected light from the target by the photo-detector 1234 through the lens 1233 and the half mirror 1232.

Another example of the configuration of the laser detection unit 1206 can be a combination of a galvano-mirror type optical scanner and a photo-detector array.

The radar transmission/reception unit 1207 includes a photo-detector 1241, a branch unit (HYB) 1242, a high-power amplifier 1243, a mixer 1244, and a low-noise amplifier 1245. The radar transmission/reception unit 1210 includes a photo-detector 1251, a branch unit 1252, a high-power amplifier 1253, a mixer 1254, and a low-noise amplifier 1255. Each radar transmission/reception unit transforms the optical signal transferred from the laser light source 1201 to a transmission signal by the photo-detector, and performs an operation like the transmission/reception unit 200 shown in FIG. 2B.

For example, the radar transmission/reception unit 1207, the transmission antenna 1208, and the reception antenna 1209 are used as the target detection apparatus $S_1$ shown in FIG. 4. The radar transmission/reception unit 1210, the transmission antenna 1211, and the reception antenna 1212 are used as the target detection apparatus $S_2$ shown in FIG. 4.

In this system, an electromagnetic wave is generated for use in two radar devices using a single laser light source 1201 as a source oscillation. Therefore, in the bistatic mode shown in FIG. 10, for example, the coherence of the local light source of $S_1$ and $S_2$ and the measurement accuracy can be enhanced when the total propagation distance is measured through the route of, for example, $S_1 \rightarrow T_1 \rightarrow S_2$.

The configuration of an antenna portion of the radar devices can be a plurality of antennas for transmission/reception shown in FIG. 2B.

Figure 13:
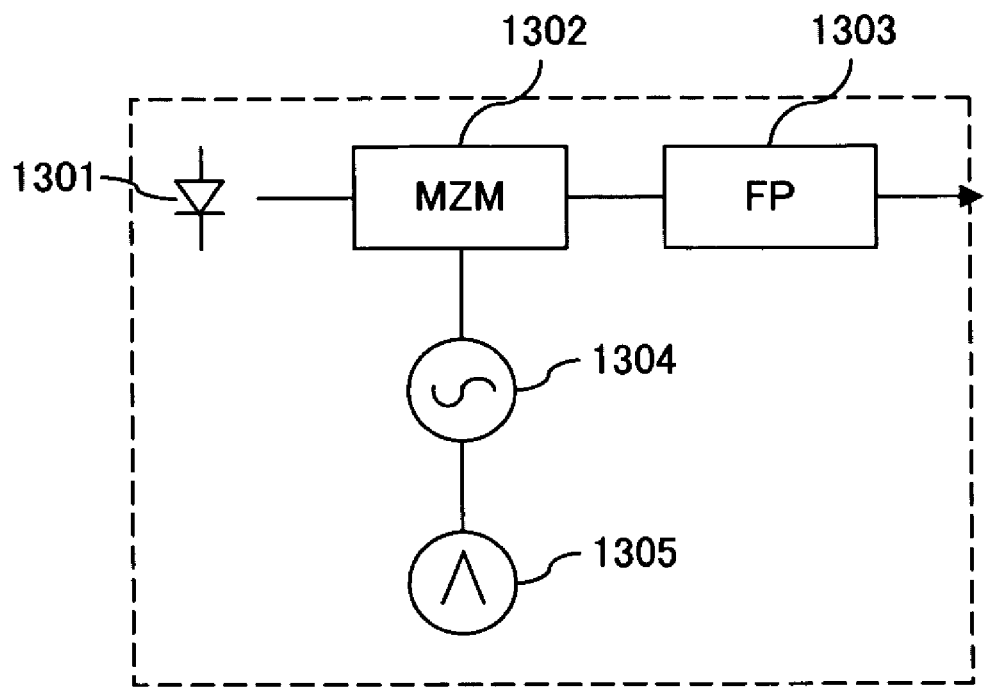
FIG. 13 shows a laser light source of indirect modulation.

FIG. 13 shows another example of the configuration of the laser light source 1201 shown in FIG. 12. The laser light source includes a distributed feedback laser 1301, a Mach-Zehnder modulator (MZM) 1302, a Fabry-Perot (FP) laser 1303, a radio frequency oscillator 1304, and a baseband oscillator 1305. The Mach-Zehnder modulator 1302 indirectly modulates the output light of the distributed feedback laser 1301 by the transmission signal generated by the baseband oscillator 1305 and the radio frequency oscillator 1304. The light from the Mach-Zehnder modulator 1302 is output through the Fabry-Perot laser 1303.

When pinpoint detection is accented over evidence integrity, it is desired that a camera is used in place of a laser in the hybrid system. In this case, a monitor area is normally monitored in a wide angle monitor mode using a radar, and an intruder is captured by the camera to keep the evidence when an intrusion is anticipated into an emergency area. This method is also used when a target which destroys and breaches any device or mechanism for physically partitioning a monitor area during the monitor time is to be identified, etc.

In the above-mentioned embodiments, a radar device with the configuration of the circuit shown in FIG. 2B or 12 is adopted as the target detection apparatuses $S_1$ and $S_2$, but it is obvious that other circuit configuration can be adopted. For example, the monopulse radar device shown in FIG. 14 and the array radar device shown in FIG. 15 can be adopted as target detection apparatuses.

Figure 14:
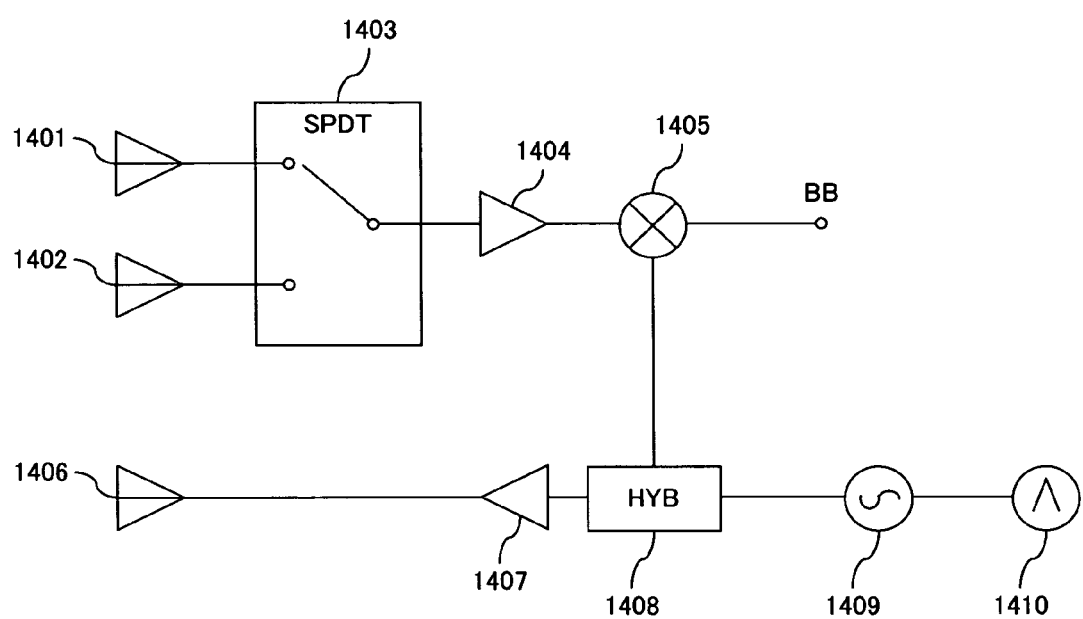
FIG. 14 shows the configuration of the monopulse radar device.

The monopulse radar device shown in FIG. 14 comprises reception antennas 1401 and 1402, a single pole double throw switch (SPDT) 1403, a low-noise amplifier 1404, a mixer 1405, a transmission antenna 1406, a high-power amplifier 1407, a branch unit (HYB) 1408, a radio frequency oscillator 1409, and a baseband oscillator 1410. The monopulse radar device has a wide angle measurement range, but can measure the angle of only one target.

The array radar device shown in FIG. 15 comprises N reception antennas 1501-1 through 1501-N, a single pole N-throw (SPNT) switch 1502, a low-noise amplifier 1503, a mixer 1504, a transmission antenna 1505, a high-power amplifier 1506, a branch unit (HYB) 1507, a radio frequency oscillator 1508, and a baseband oscillator 1509. The array radar device can position a number of targets using an array antenna comprising the reception antennas 1501-1 through 1501-N, but the angle measurement range is normally narrow.

When the space division shown in FIG. 4 is used, it is desired to mount three monopulse radar devices or array radar devices as each of the target detection apparatuses $S_1$ and $S_2$. In this case, the space division of a monitor area is performed based on time, frequency, code, etc.

Furthermore, the target detection apparatus can be another device such as a sonar (including ultra-sonic) device, etc. in place of a radar device. For example, when a sonar device is used as the target detection apparatus shown in FIG. 2B, the antennas A1 through A4 can be replaced with acoustic sensors (piezoelectric elements) for transmitting/receiving an acoustic wave, and the radio frequency oscillator 209 can be replaced with a sonar oscillator.

Similarly, when a sonar device is used in place of the radar device shown in FIG. 12, the transmission antennas 1208 and 1211 and the reception antennas 1209 and 1212 can be replaced with acoustic sensors, and the radio frequency oscillator 1222 can be replaced with a sonar oscillator.

When three or more target detection apparatuses are used in the systems shown in FIGS. 4, 9, and 10, the processing unit 401 can perform a positioning process using a similar algorithm by combining at least two appropriate target detection apparatuses.

Figure 16:
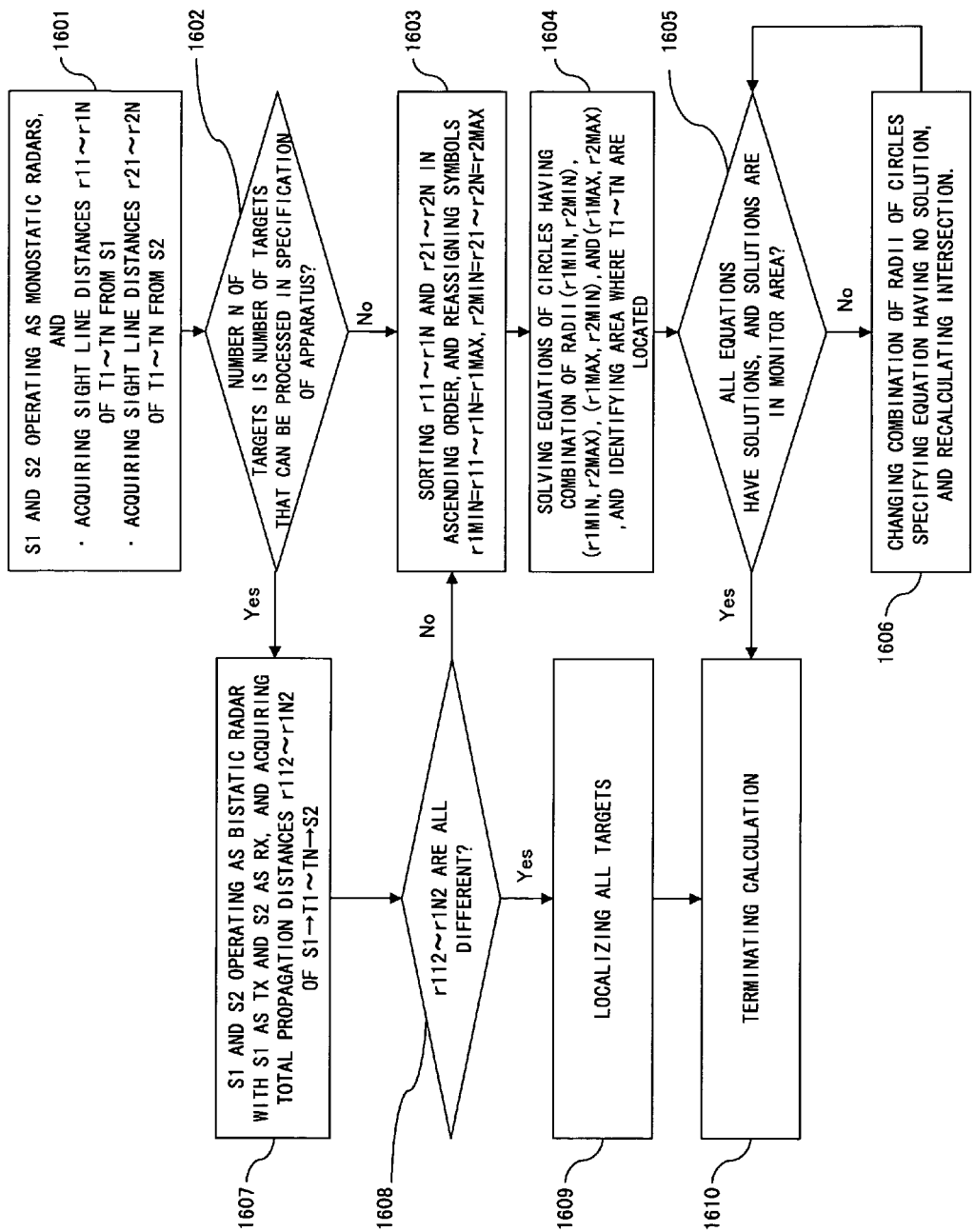
FIG. 16 is a flowchart of the third positioning method.

Next, the positioning method used when N targets $T_1 \sim T_N$ exist in the monitor area is explained below. For example, FIG. 16 shows a flowchart of the positioning method using two target detection apparatuses shown in FIGS. 9 and 10.

First, a processing unit 401 enables the target detection apparatus $S_1$ and $S_2$ as normal monostatic radars, and acquires the sight line distances $r_{11} \sim r_{1N}$ from $S_1$ to $T_1 \sim T_N$, and the sight line distances $r_{21} \sim r_{2N}$ from $S_2$ to $T_1 \sim T_N$ (step 1601). Then, it is determined whether or not the number N of targets refers to the number of targets that can be processed by the processing unit 401 (step 1602). It is assumed that the upper limit of the number of targets is stored in the memory in advance.

If the number N of targets refers to the number of targets that can be processed, then a bistatic radar operates using $S_1$ and $S_2$ as a transmitter and a receiver respectively, and total propagation distances $r_{112} \sim r_{1N2}$ of N routes $S_1 \rightarrow T_1 \rightarrow S_2 \sim S_1 \rightarrow T_N \rightarrow S_2$ are acquired (step 1607). Then, it is checked whether or not all the obtained values $r_{112} \sim r_{1N2}$ are different (step 1608).

If $r_{112} \sim r_{1N2}$ are all different values, the coordinates of the targets $T_1 \sim T_{1N}$ are calculated using the values (step 1609), thereby terminating the positioning process (step 1610).

In step 1602, if the number N of targets exceeds the number of targets that can be processed, the sight line distances $r_{11} \sim r_{1N}$ and $r_{21} \sim r_{2N}$ are sorted in an ascending order and the symbols $r_{11} \sim r_{1N}$ and $r_{21} \sim r_{2N}$ are re-assigned in the ascending order (step 1603). Thus, the minimum value $r_{1min}$ of the sight line distances from $S_1$ is $r_{11}$, and the maximum value $r_{1max}$ is $r_{1N}$. Similarly, the minimum value $r_{2min}$ of the sight line distances from $S_2$ is $r_{21}$, and the maximum value $r_{2max}$ is $r_{2N}$.

Next, the simultaneous equations of the circles having the combination of the radii $(r_{1min}, r_{2min})$, $(r_{1min}, r_{2max})$, $(r_{1max}, r_{2min})$, and $(r_{1max}, r_{2max})$ are solved and the area of the targets $T_1 \sim T_N$ is identified (step 1604). Then, it is checked whether or not all equations have solutions and the solutions are within the monitor area (step 1605). If such a solution can be obtained, the positioning operation is terminated (step 1610).

Figure 17:
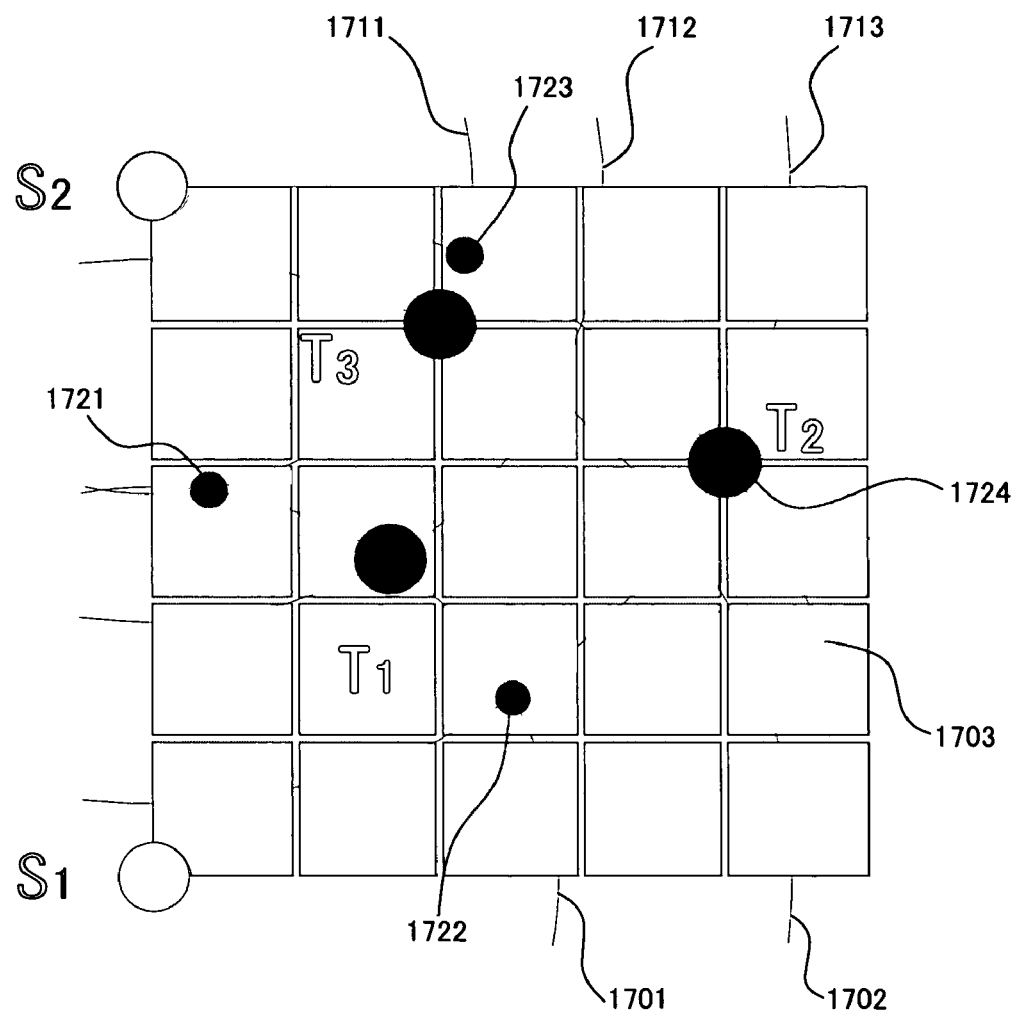
FIG. 17 shows the first location range of three targets.

For example, as shown in FIG. 17, when there are three targets $T_1 \sim T_3$ within the monitor area, an equation of a circle can be considered for each of the circles 1701~1703 and 1711~1713 respectively having the radii of the sight line distances $r_{11} \sim r_{13}$ and $r_{21} \sim r_{23}$ after the sorting. Among them, by solving the simultaneous equations of the circles having the combination of radii $(r_{11}, r_{21})$, $(r_{11}, r_{23})$, $(r_{13}, r_{21})$, and $(r_{13}, r_{23})$, the coordinates of the four intersections 1721~1724 can be obtained. The targets $T_1 \sim T_3$ are included in the area enclosed by the intersections. Then, for example, the area of the rectangle having the intersections as vertexes is identified as the location range of the targets $T_1 \sim T_3$.

In step 1605, if a part of equations have no solutions or a solution is not within the monitor area, then the combination of the radii specifying the equation is changed, and the intersection is re-calculated (step 1606), and the processes in and after step 1605 are performed.

Figure 18:
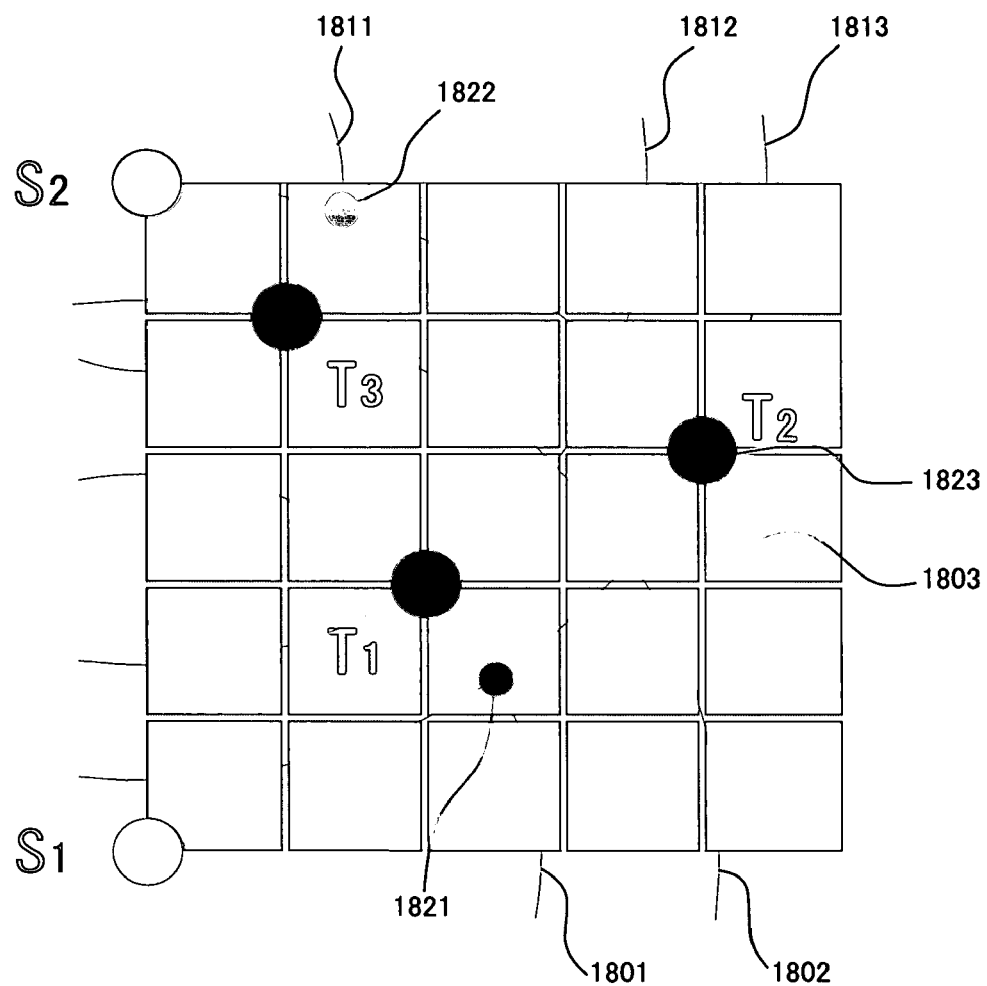
FIG. 18 shows the second location range of three targets.

For example, as shown in FIG. 18, the equations of circles can be considered for the respective circles 1801~1803 and 1811~1813 having as radii the sight line distances $r_{11} \sim r_{13}$ and $r_{21} \sim r_{23}$ of the targets $T_1 \sim T_3$ after sorting. Among them, by solving the simultaneous equations of the circles having the combination of radii $(r_{11}, r_{23})$, $(r_{13}, r_{21})$, and $(r_{13}, r_{23})$, the coordinates of the three intersections 1821~1823 can be obtained.

However, since the circles 1801 and 1811 having the combination of radii $(r_{11}, r_{21})$ have no intersections, no solutions can be obtained from the combination. Then, using the second smallest sight line distance $r_{12}$ and $r_{22}$, the simultaneous equations of the circles having the combination of radii of $(r_{11}, r_{22})$ and $(r_{12}, r_{21})$ are newly solved. Thus, the coordinates of the targets $T_1$ and $T_3$ as the closest intersections to the target detection apparatuses $S_1$ and $S_2$ can be obtained. In this case, for example, the area of the polygon having as the vertexes the intersections 1821~1823 and the positions of $T_1$ and $T_3$ is identified as the location range of the targets $T_1$~$T_3$.

In step 1608, if a part of the total propagation distances $r_{112}$~$r_{1N2}$ has the same value, the processes in and after step 1603 are performed.

In the above-mentioned positioning method, even if a number of targets enter the monitor area and all targets cannot be localized within a predetermined time with the performance of the processing unit 401 taken into account, the location range of the targets can be identified and recognized as critical areas.

Figure 19:
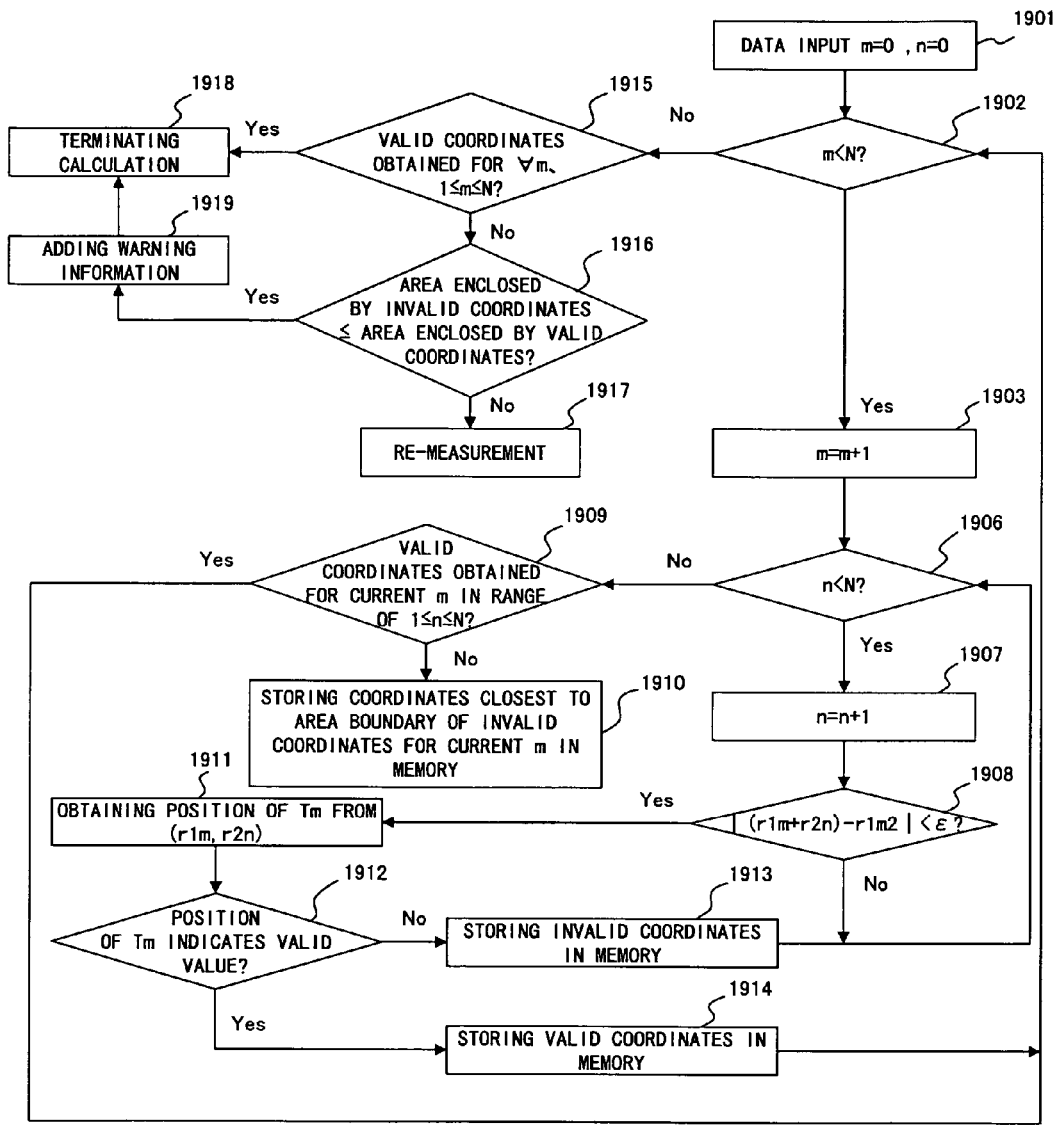
FIG. 19 is a flowchart of the localizing process of N targets.

FIG. 19 is a flowchart of the localizing process of the targets $T_1$~$T_N$ in step 1609 shown in FIG. 16. First, the processing unit 401 stores as data the sight line distances $r_{11}$~$r_{1N}$ and $r_{21}$~$r_{2N}$ and the total propagation distances $r_{112}$~$r_{1N2}$ in the memory, and sets the control variables m and n to 0 (step 1901). Then, m is compared with the number N of targets (step 1902).

If m is smaller than N, then m=m+1 (step 1903), and then n is compared with N (step 1906).

If n is smaller than N, then n=n+1 (step 1907), and it is checked using a small threshold $\epsilon$ whether or not the following inequality is satisfied (step 1908).

$$|(r_{1m}+r_{2n})-r_{1m2}|<\epsilon \tag{10}$$

If the inequality is satisfied, the coordinates of the target $T_m$ are calculated from the simultaneous equations of the circles having the combination of radii $(r_{1m}, r_{2n})$ (step 1911), and it is checked whether or not the coordinates are valid values (step 1912). If the coordinates of the target $T_m$ are not valid values, then the coordinates are stored in the memory as invalid coordinates (step 1913), and the processes in and after step 1906 are repeated. If the coordinates of the target $T_m$ are valid values, the coordinates are stored as valid values in the memory (step 1914), and the processes in and after step 1902 are repeated. In step 1908, if the inequality is not satisfied, the processes in and after 1906 are repeated.

In step 1906, if n has reached N, then it is checked whether or not the valid values for the current value of m have been obtained in the range of $1 \leq n \leq N$ (step 1909). If the valid coordinates are stored in the memory, the processes in and after step 1902 are repeated. If such valid coordinates are not stored in the memory, the coordinates closest to the boundary of the monitor area of the invalid coordinates for the current value of m are stored in the memory as the invalid coordinates of the target $T_m$ (1910), thereby repeating the processes in and after step 1902.

If m has reached N in step 1902, then it is checked whether or not valid coordinates have been obtained for all values of m in the range of $1 \leq m \leq N$ (step 1915). If all the valid coordinates are stored in the memory, the calculation is terminated (step 1918).

If invalid coordinates are stored in the memory for any value of m, then it is checked whether or not the area enclosed by the valid coordinates includes an area enclosed by the invalid coordinates (step 1916). If the former includes the latter, warning information is added to the calculation result (step 1919), thereby terminating the calculation (step 1918). If the former does not include the latter, the operations in and after step 1601 shown in FIG. 16 are repeated and re-measurement is performed (step 1917).

In steps 1607 through 1609 shown in FIG. 16, instead of operating the target detection apparatuses $S_1$ and $S_2$ as a bistatic radar, the monitor area can be spatially divided as shown in FIG. 4, and the coordinates of N targets $T_1$~$T_N$ can be obtained.

What is claimed is:

1. A target detection apparatus, comprising:
   a transmission/reception device for generating a transmission signal for detection of a target, and extracting distance information about the target from a received signal;
   a plurality of sensors each of which transmits the transmission signal to respective different angle ranges, receives a signal reflected by the target, and transfers the received signal to the transmission/reception device; and
   a switch device for switching in a time division manner a connection between the transmission/reception device and one of the plurality of sensors to a connection between the transmission/reception device and another of the plurality of sensors, wherein the switch device selects a first sensor of the plurality of sensors for transmitting the transmission signal in a time slot and a second sensor of the plurality of sensors for receiving the signal reflected by the target in the time slot.

2. The apparatus according to claim 1, further comprising:
   an optical system sensor, wherein
   the plurality of sensors normally perform a wide angle monitoring process, and when it is anticipated that the target intrudes to an emergency area, the optical system sensor detects the target.

3. A target detection system, comprising:
   a first target detection apparatus having a plurality of sensors for transmitting a first transmission signal to respective different angle ranges and receiving a signal reflected by a target, and extracting first distance information about the target from a received signal;
   a second target detection apparatus having a plurality of sensors for transmitting a second transmission signal to respective different angle ranges and receiving a signal reflected by the target, and extracting second distance information about the target from a received signal; and
   a processing device for calculating a position of the target according to the first and second distance information using a condition that the position of the target is included in an area common to both a first angle range when the first target detection apparatus extracts the first distance information and a second angle range when the second target detection apparatus extracts the second distance information.

4. The system according to claim 3, wherein
   the first and second target detection apparatuses are mounted in different positions around a monitor area, the plurality of sensors of the first target detection apparatus scan the respective angle ranges for each time slot assigned in a time division manner, the first target detection apparatus extracts the first distance information from a received signal in a time slot in which the common area is scanned, the plurality of sensors of the second target detection apparatus scan the respective angle ranges for each time slot assigned in a time division manner, and the second target detection apparatus extracts the second distance information from a received signal in a time slot in which the common area is scanned.

5. The system according to claim 3, wherein
the first and second target detection apparatuses are mounted at different positions around a monitor area, the monitor area is divided into a plurality of exclusive areas by the angle ranges of the plurality of sensors of the first target detection apparatus and the angle ranges of the plurality of sensors of the second target detection apparatus, the processing device compares a code of each exclusive area included in the first angle range with a code of each exclusive area included in the second angle range, and identifies the common area from a common code in both angle ranges.

6. The system according to claim 3, wherein
the first target detection apparatus further comprises: a first transmission/reception device for generating the first transmission signal and extracting the first distance information from a received signal; and a first switch device for switching a connection between the first transmission/reception device and one of the plurality of sensors to a connection between the first transmission/reception device and another of the plurality of sensors in a time division manner, and the second target detection apparatus further comprises: a second transmission/reception device for generating the second transmission signal and extracting the second distance information from a received signal; and a second switch device for switching a connection between the second transmission/reception device and one of the plurality of sensors to a connection between the second transmission/reception device and another of the plurality of sensors in a time division manner.

7. The system according to claim 3, further comprising:
an optical system sensor, wherein
the first and second target detection apparatuses normally perform a wide angle monitoring process, and when it is anticipated that the target intrudes to an emergency area, the optical system sensor detects the target.

8. The system according to claim 3, further comprising:
a laser light source for generating an optical signal by modulating laser light, and distributing the optical signal to the first and second target detection apparatuses, wherein the first and second target detection apparatuses transform using a photo-detector the optical signal to the first transmission signal and the second transmission signal respectively.

9. A target detection system, comprising:
a first target detection apparatus for transmitting a first transmission signal, receiving a signal reflected by a target, and extracting first distance information about the target from a received signal;
a second target detection apparatus for transmitting a second transmission signal, receiving a signal reflected by the target, and extracting second distance information about the target from a received signal;
a processing device for enabling the first and second target detection apparatuses to operate for a plurality of targets in a monostatic mode, acquiring first distance information from the first target detection apparatus to each target, and the second distance information from the second target detection apparatus to each target, enabling the first and second target detection apparatuses to operate in a bistatic mode in which the first target detection apparatus is a transmitter and the second target detection apparatus is a receiver, acquiring, for each target, total propagation distance information from the transmitter to the receiver through each target, and identifying positions of the plurality of targets by comparing a sum of the first distance information and the second distance information with the total propagation distance information about each target.

10. The system according to claim 9, further comprising:
an optical system sensor, wherein
the first and second target detection apparatuses normally perform a wide angle monitoring process, and when it is anticipated that the target intrudes to an emergency area, the optical system sensor detects the target.

11. The system according to claim 9, further comprising:
a laser light source for generating an optical signal by modulating laser light, and distributing the optical signal to the first and second target detection apparatuses, wherein the first and second target detection apparatuses transform using a photo-detector the optical signal to the first transmission signal and the second transmission signal respectively.

12. A target detection system, comprising:
a first target detection apparatus for transmitting a first transmission signal, receiving a signal reflected by a target, and extracting first distance information about the target from a received signal;
a second target detection apparatus for transmitting a second transmission signal, receiving a signal reflected by the target, and extracting second distance information about the target from a received signal; and
a processing device for enabling the first and second target detection apparatuses to operate for a plurality of targets, acquiring first distance information from the first target detection apparatus to each target, and the second distance information from the second target detection apparatus to each target, obtaining coordinates of intersections from equations of four circles having, as radii, a minimum value and a maximum value of the first distance information for the targets and a minimum value and a maximum value of the second distance information for the targets, and identifying a location range of the plurality of targets using the coordinates of the intersections.

13. The system according to claim 12, wherein
when a part of the equations of the four circles have no solutions, the processing device changes a combination of radii that specifies the equations of the part, recalculates the coordinates of the intersections, and identifies the location range of the plurality of targets using the obtained coordinates of the intersections.

* * * * *